United States Patent
Zabaloy et al.

(10) Patent No.: US 12,486,935 B2
(45) Date of Patent: Dec. 2, 2025

(54) PIPE CONNECTION FOR EXPLORATION AND PRODUCTION OF A HYDROCARBON WELL

(71) Applicant: Tenaris Connections B.V., Amsterdam (NL)

(72) Inventors: Julian Ignacio Zabaloy, Buenos Aires (AR); Luciano Omar Mantovano, Buenos Aires (AR); Gaston Mauro Mazzaferro, Buenos Aires (AR); Nicolas Rodrigo Bohun, Buenos Aires (AR)

(73) Assignee: Tenaris Connections B.V., Amsterdam (NL)

( * ) Notice: Subject to any disclaimer, the term of this patent is extended or adjusted under 35 U.S.C. 154(b) by 235 days.

(21) Appl. No.: 18/555,836

(22) PCT Filed: May 6, 2022

(86) PCT No.: PCT/EP2022/062241
§ 371 (c)(1),
(2) Date: Oct. 17, 2023

(87) PCT Pub. No.: WO2022/234061
PCT Pub. Date: Nov. 10, 2022

(65) Prior Publication Data
US 2024/0209972 A1  Jun. 27, 2024

(30) Foreign Application Priority Data

May 6, 2021 (NL) .................................. 2028158

(51) Int. Cl.
*F16L 37/098* (2006.01)
*E21B 17/046* (2006.01)

(52) U.S. Cl.
CPC ........ *F16L 37/0985* (2013.01); *E21B 17/046* (2013.01)

(58) Field of Classification Search
CPC ....... F16L 37/00; F16L 37/0985; F16L 37/08; F16L 37/084; F16L 37/088; F16L 37/091; F16L 21/00; F16L 21/06; F16L 25/06; E21B 17/046
See application file for complete search history.

(56) References Cited

U.S. PATENT DOCUMENTS

| | | | | | |
|---|---|---|---|---|---|
| 2,452,219 | A | * | 10/1948 | Lennart | F16L 37/0985 285/332 |
| 3,625,549 | A | * | 12/1971 | De Vries | F16L 21/06 285/39 |
| 7,874,596 | B2 | * | 1/2011 | Kertesz | F16L 37/0985 285/383 |
| 9,334,988 | B2 | * | 5/2016 | Gallagher | F16L 19/005 |

(Continued)

*Primary Examiner* — Aaron M Dunwoody
(74) *Attorney, Agent, or Firm* — Morgan, Lewis & Bockius LLP

(57) ABSTRACT

Pipe connection for exploration and production of a hydrocarbon well, said pipe connection comprising a primary pipe member having an axially extending primary alignment sleeve and one of a second protrusion and a second slot, a secondary pipe member comprising an axially extending secondary alignment sleeve and one of a second protrusion and a second slot, and a locking ring configured to engage the primary pipe member and the secondary pipe member.

14 Claims, 18 Drawing Sheets

(56) References Cited

U.S. PATENT DOCUMENTS

Figure 1:
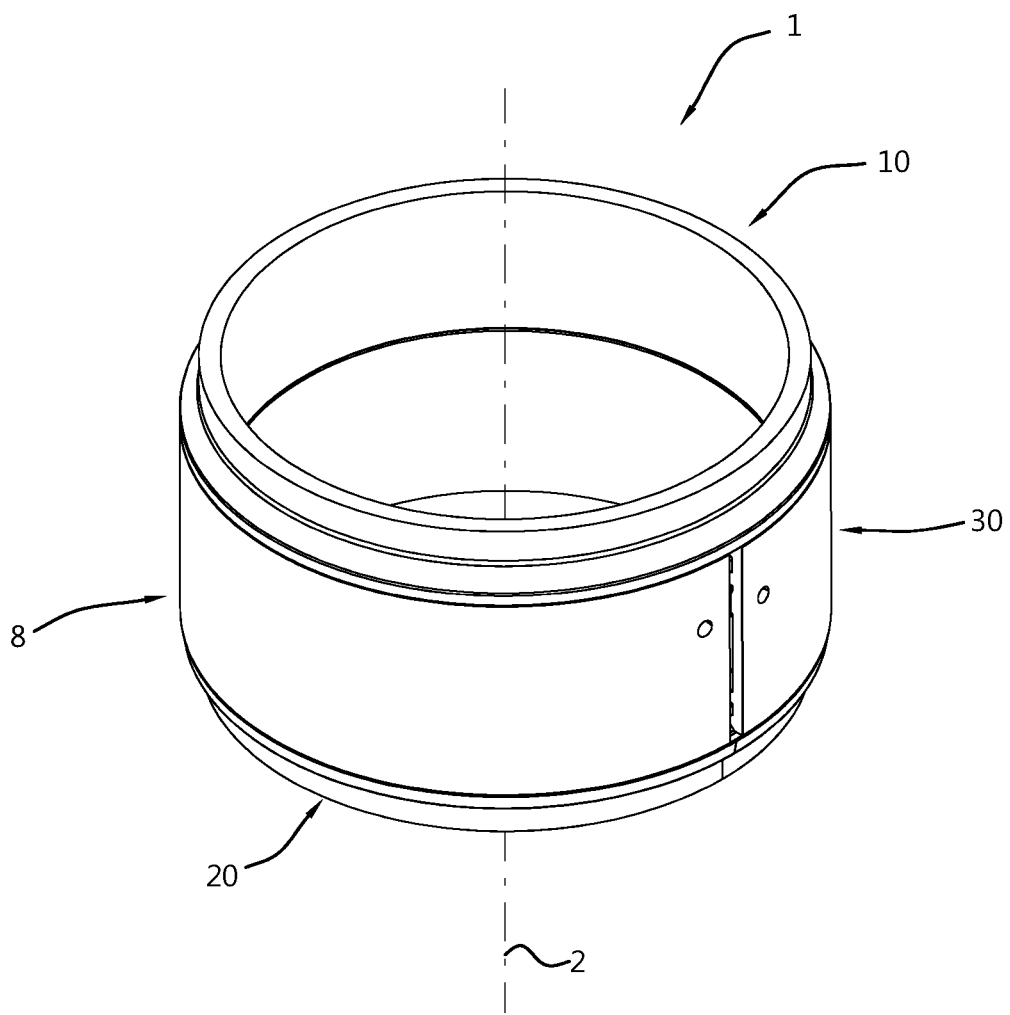

| | | | | |
|---|---|---|---|---|
| 11,035,182 B2* | 6/2021 | Triadou | ............... | E21B 17/085 |
| 2006/0152005 A1* | 7/2006 | Kertesz | ............... | F16L 37/0985 |
| | | | | 285/406 |
| 2017/0074052 A1* | 3/2017 | Persent | ................... | E21B 17/18 |
| 2018/0363390 A1* | 12/2018 | Persent | ................ | E21B 17/046 |
| 2019/0136642 A1* | 5/2019 | Persent | ................ | E21B 17/046 |
| 2024/0209972 A1* | 6/2024 | Zabaloy | ................ | F16L 37/088 |

\* cited by examiner

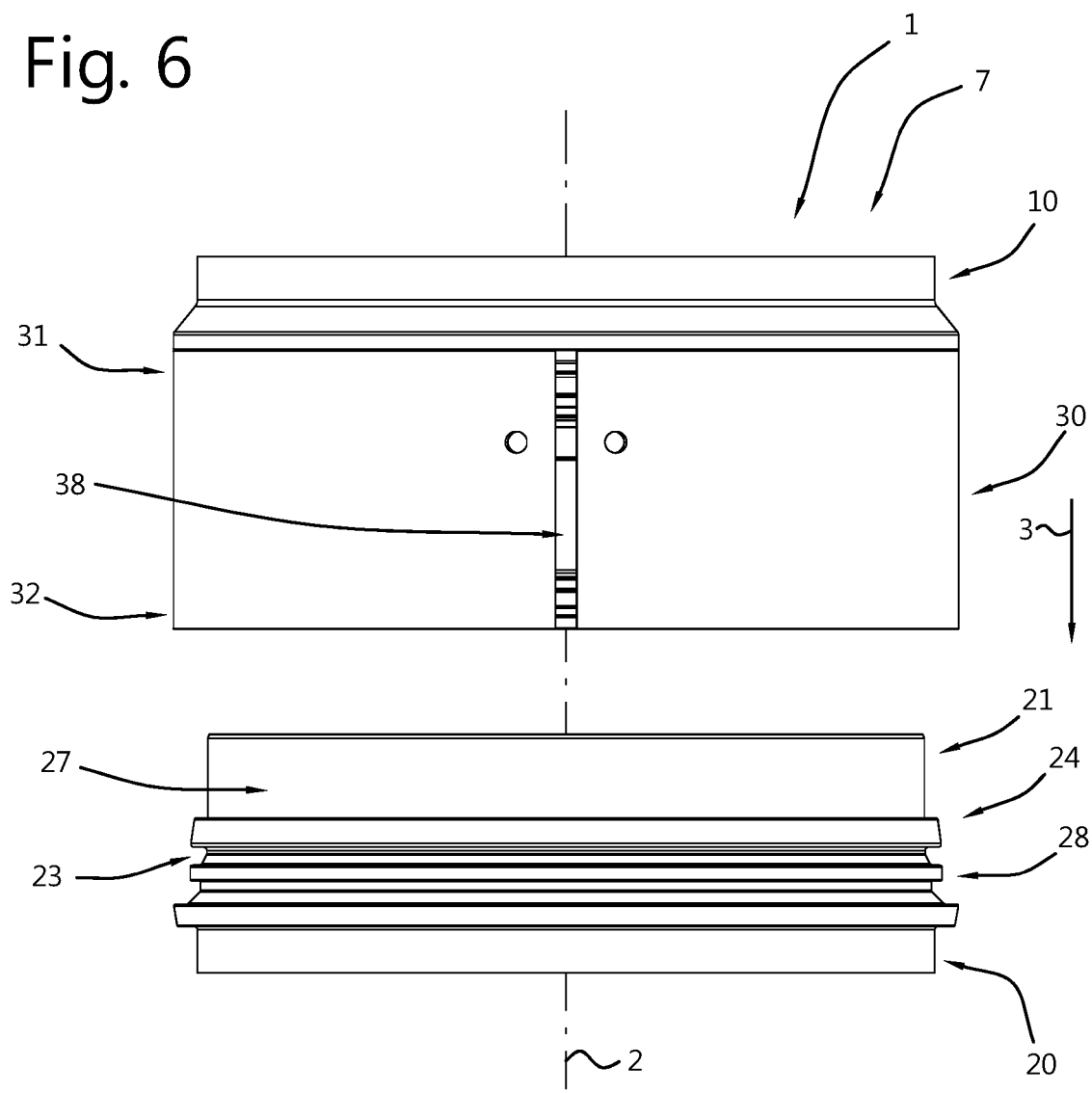

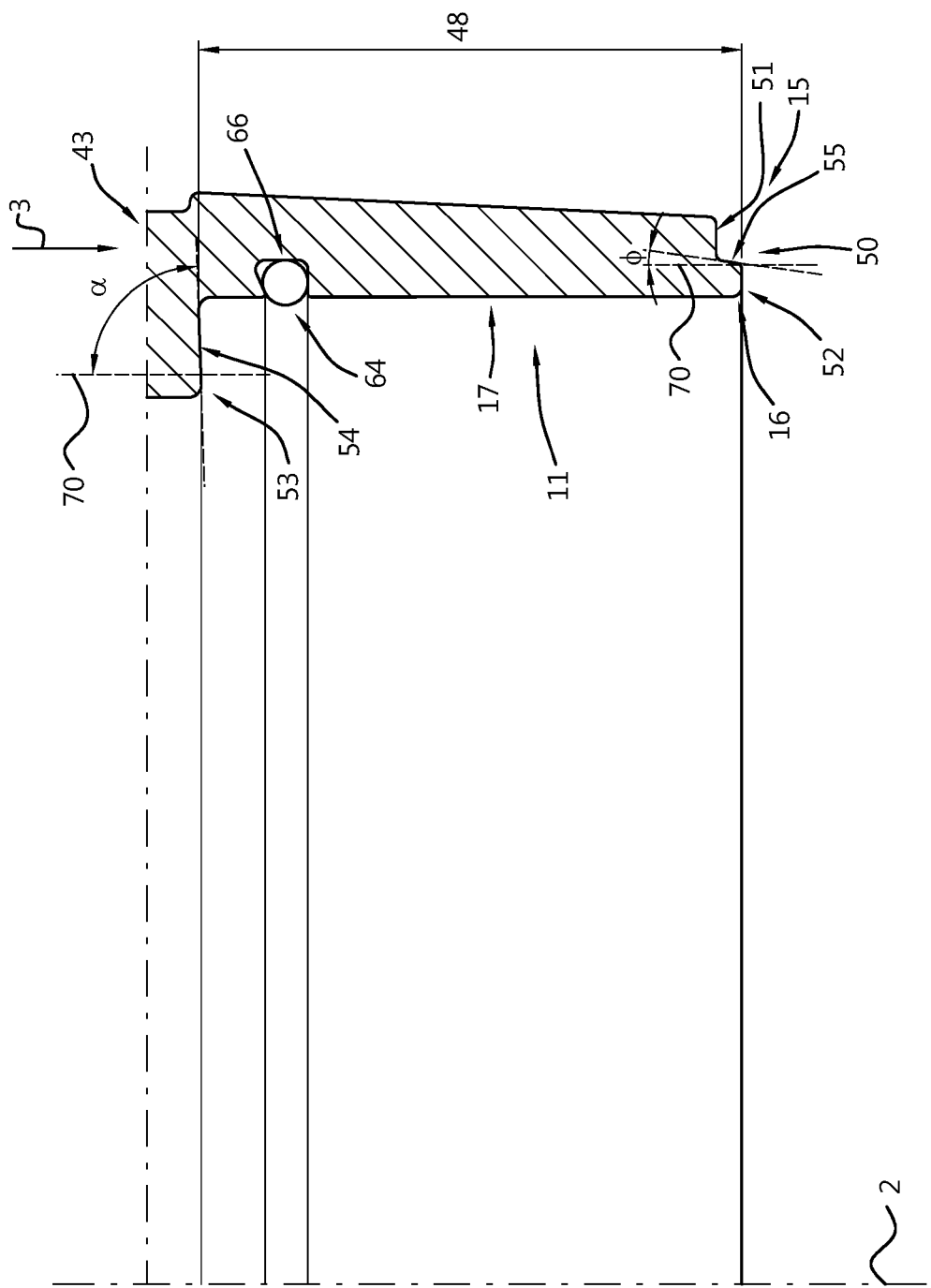

PIPE CONNECTION FOR EXPLORATION AND PRODUCTION OF A HYDROCARBON WELL

FIELD OF THE INVENTION

The invention relates to a pipe connection for exploration and production of a hydrocarbon well.

The pipe connection comprises a primary pipe member, a secondary pipe member and a locking ring engaging the primary pipe member and the secondary pipe member.

The primary pipe member comprises a primary alignment sleeve and one of a first protrusion and a first slot. Said one of the first protrusion and the first slot is provided at a primary circumferential surface of the primary pipe member.

The secondary pipe member comprises a secondary alignment sleeve and one of a second protrusion and a second slot. Said one of the second protrusion and the second slot is provided at a secondary circumferential surface of the secondary pipe member.

The locking ring is resilient in radial direction and comprises a primary ring part having the other of the first protrusion and the first slot, a secondary ring part having the other of the second protrusion and the second slot, and a ring circumferential surface defining a ring diameter. Said other of the first protrusion and the first slot and said other of the second protrusion and the second slot are provided at the ring circumferential surface of the locking ring and located at an axial ring distance from each other.

The locking ring is configured to engage the primary pipe member with the primary ring part by having said one of the first protrusion and the first slot of the primary pipe member engaged with said other of the first protrusion and the first slot of the locking ring.

The locking ring is configured to engage the secondary pipe member with the secondary ring part by having said one of the second protrusion and the second slot of the secondary pipe member engaged with said other of the second protrusion and the second slot of the locking ring.

BACKGROUND OF THE INVENTION

This type of pipe connection is often used for conductor pipe strings, but may also be used for other types of pipe strings for exploration and production of a hydrocarbon well, such as for forming a landing string.

The locking ring is used to connect the primary pipe member and the secondary pipe member to each other.

SUMMARY OF THE INVENTION

The known pipe connections have the disadvantage that there is a relatively high risk that the locking ring is not correctly engaged with the secondary pipe member after make-up is finished. More specifically, said one of the second protrusion and the second slot of the secondary pipe member is not correctly engaged with said other of the second protrusion and the second slot of the locking ring. This makes the pipe connection less reliable. Preventing incorrect engagement of the locking ring with the secondary pipe member is relevant because repairing an incorrect connected pipe connection is time consuming and if not repaired it may lead to failure of the pipe string during exploration and production of a hydrocarbon well.

The invention has the objective to provide an improved, or at least alternative, pipe connection for exploration and production of a hydrocarbon well. Said pipe connection comprises:

a primary pipe member comprising an axially extending primary alignment sleeve and one of a first protrusion and a first slot, wherein said one of the first protrusion and the first slot is provided at a primary circumferential surface of the primary pipe member, a secondary pipe member comprising an axially extending secondary alignment sleeve and one of a second protrusion and a second slot, wherein said one of the second protrusion and the second slot is provided at a secondary circumferential surface of the secondary pipe member, and a locking ring being resilient in radial direction and comprising a primary ring part having the other of the first protrusion and the first slot, a secondary ring part having the other of the second protrusion and the second slot, and a ring circumferential surface defining a ring diameter, wherein said other of the first protrusion and the first slot and said other of the second protrusion and the second slot are provided at the ring circumferential surface of the locking ring and located at an axial ring distance from each other, and wherein:

the locking ring is configured to engage the primary pipe member with the primary ring part by having said one of the first protrusion and the first slot of the primary pipe member engaged with said other of the first protrusion and the first slot of the locking ring, the locking ring is configured to engage the secondary pipe member with the secondary ring part by having said one of the second protrusion and the second slot of the secondary pipe member engaged with said other of the second protrusion and the second slot of the locking ring, the secondary pipe member comprises an adjustment portion provided at the secondary circumferential surface to elastically adjust the ring diameter at the secondary ring part of the locking ring in order to facilitate engagement of said one of the second protrusion and the second slot of the secondary pipe member with said other of the second protrusion and the second slot of the locking ring during make-up of the pipe connection in which the locking ring being engaged with the primary pipe member is moved in axial direction towards the secondary pipe member, and the primary alignment sleeve and the secondary alignment sleeve are of substantially equal length and configured to, during said make-up of the pipe connection, overlap each other in axial direction for alignment of the primary pipe member and the secondary pipe member before the locking ring contacts the adjustment portion of the secondary member.

The locking ring is first attached to the primary pipe member. Attaching the locking ring to the primary pipe member can be performed at the mill where the primary pipe member, the secondary pipe member and the locking ring are produced, or can be performed outside the mill at a different location.

The locking ring being engaged with the primary pipe member is during make-up of the pipe connection (at the hydrocarbon well) moved in axial direction towards the secondary pipe member in order to attach the locking ring to the secondary pipe member. Final make-up of the pipe connection is reached when the locking ring engages the primary pipe member and the secondary pipe member.

The overlapping primary alignment sleeve and the secondary alignment sleeve align the primary pipe member and the secondary pipe member during said make-up of the pipe connection in which the locking ring being engaged with the primary pipe member is moved in axial direction towards the secondary pipe member. By ensuring that, during said make-up, the primary alignment sleeve and the secondary alignment sleeve overlap before the locking ring contacts the adjustment portion of the secondary member, the primary pipe member and the secondary pipe member are aligned when the ring diameter of the locking ring is elastically adjusted in order to facilitate engagement of the secondary pipe member with the locking ring. Having the primary pipe member and the secondary pipe member aligned during the part of said make-up in which the locking ring is adjusted and placed in engagement with the secondary pipe member reduces the risk that the locking ring engages the secondary pipe member incorrectly after make-up has finished. More specifically, the risk that said one of the second protrusion and the second slot of the secondary pipe member incorrectly engages with said other of the second protrusion and the second slot of the locking ring is reduced. As a result, a more reliable pipe connection is obtained.

At final make-up of the pipe connection, the locking ring engages the primary pipe member and the secondary pipe member, and the primary pipe member, secondary pipe member and the locking ring extend along a longitudinal axis. The used terms "axial" and "radial" relate to said longitudinal axis.

In an embodiment of the pipe connection according to the invention, the primary alignment sleeve comprises a primary pipe end of the primary pipe member, the secondary alignment sleeve comprises a secondary pipe end of the secondary pipe member, and the primary pipe end is in axial direction positioned beyond the secondary pipe end when the primary pipe member and the secondary pipe member overlap each other.

In an embodiment of the pipe connection according to the invention,
  the locking ring comprises a first contact ring area configured to make first contact with the adjustment portion of the secondary pipe member to adjust the ring diameter at the secondary ring part during said make-up of the pipe connection,
  the adjustment portion comprises a first contact portion area configured to make first contact with the locking ring, more specifically the first contact ring area, to adjust the ring diameter at the secondary ring part during said make-up of the pipe connection,
  the primary alignment sleeve comprises a first overlap primary sleeve area which overlaps as first the secondary alignment sleeve during said make-up of the pipe connection,
  the secondary alignment sleeve comprises a first overlap secondary sleeve area which overlaps as first the primary alignment sleeve, more specifically the first overlap primary sleeve area, during said make-up of the pipe connection, and
  a first axial distance between the first contact ring area and the first overlap primary sleeve area of the locking ring being engaged to the primary pipe member is shorter than a second axial distance between the first contact portion area and the first overlap secondary sleeve area.

In particular, the used term "area" may refer to a section of a surface of a body.

In an embodiment of the pipe connection according to the invention, said first axial distance and said second axial distance overlap in axial direction. In particular, said second axial distance overlaps said first axial distance completely in axial direction.

In an embodiment of the pipe connection according to the invention,
  the primary alignment sleeve comprises a primary alignment surface,
  the secondary alignment sleeve comprises a secondary alignment surface,
  the primary alignment sleeve and the secondary alignment sleeve are configured to overlap with the primary alignment surface and the secondary alignment surface facing each other.

In an embodiment of the pipe connection according to the invention,
  the primary alignment surface and the secondary alignment surface are configured to slide along each other during make-up of the pipe connection.

In an embodiment of the pipe connection according to the invention,
  the primary circumferential surface of the primary pipe member is a primary external circumferential surface,
  the secondary circumferential surface of the primary pipe member is a secondary external circumferential surface,
  the ring circumferential surface of the locking ring is a ring internal circumferential surface, and
  the adjustment portion is an external adjustment portion configured to increase the ring diameter of the secondary ring part of the locking ring.

The terms "internal" and "external" are used in reference to the longitudinal axis. In particular, an internal surface may face towards the longitudinal axis, and an external surface may face away from the longitudinal axis.

In an embodiment of the pipe connection according to the invention,
  the primary pipe member comprises a primary internal circumferential surface,
  the secondary pipe member comprises a secondary internal circumferential surface, and
  the primary internal circumferential surface and the secondary internal circumferential surface are flush with each other.

In an embodiment of the pipe connection according to the invention,
  the pipe connection is free from any items provided at the primary internal circumferential surface and the secondary internal circumferential surface forming an obstruction in axial direction.

In an embodiment of the pipe connection according to the invention,
  the primary circumferential surface of the primary pipe member is a primary internal circumferential surface,
  the secondary circumferential surface of the primary pipe member is a secondary internal circumferential surface,
  the ring circumferential surface of the locking ring is a ring external circumferential surface, and
  the adjustment portion is an internal adjustment portion configured to decrease the ring diameter of the secondary ring part of the locking ring.

In an embodiment of the pipe connection according to the invention,
  the primary pipe member comprises a primary external circumferential surface,
  the secondary pipe member comprises a secondary external circumferential surface, and the primary external circumferential surface and the secondary external circumferential surface are flush with each other.

In an embodiment of the pipe connection according to the invention,
the pipe connection is free from any items provided at the primary external circumferential surface and the secondary external circumferential surface forming an obstruction in axial direction.

In an embodiment of the pipe connection according to the invention, the secondary alignment sleeve is located closer to the longitudinal axis than the primary alignment sleeve.

In an embodiment of the pipe connection according to the invention, the primary alignment sleeve is in radial direction at final make-up located between the secondary alignment sleeve and the locking ring.

In an embodiment of the pipe connection according to the invention, the primary alignment sleeve is located closer to the secondary alignment sleeve than the locking ring. In particular, the primary alignment sleeve may be located closer to the secondary alignment sleeve than the ring circumferential surface defining the ring diameter. Even more in particular, the primary alignment sleeve may be located closer to the secondary alignment sleeve than the ring internal circumferential surface.

In an embodiment of the pipe connection according to the invention,
the primary pipe member comprises a primary member body having said one of the first protrusion and the first slot,
the secondary pipe member comprises a secondary member body having said one of the second protrusion and the second slot,
the primary alignment sleeve extends away from the primary member body, and
the secondary alignment sleeve extends away from the secondary member body.

The adjustment portion may be provided at the secondary member body. In particular, the adjustment portion may be formed as not being part of the secondary alignment sleeve.

In an embodiment of the pipe connection according to the invention,
the primary member body and the primary alignment sleeve are integrally formed, and
the secondary member body and the secondary alignment sleeve are integrally formed.

In an embodiment of the pipe connection according to the invention,
the primary alignment sleeve has a primary length in axial direction,
the secondary alignment sleeve has a secondary length in axial direction, and
the primary length and the secondary length are substantially equal to each other.

In an embodiment of the pipe connection according to the invention,
the primary alignment sleeve comprises a primary nose,
the secondary alignment sleeve comprises a secondary nose,
the primary pipe member comprises a primary shoulder, and
the secondary pipe member comprises a secondary shoulder.

The adjustment portion may be provided at the secondary shoulder.

In an embodiment of the pipe connection according to the invention, the primary nose is at final make-up adjacent to the secondary shoulder, and the primary shoulder is at final make-up adjacent to the secondary nose.

In an embodiment of the pipe connection according to the invention,
the primary length extends from the primary shoulder until the primary nose, and
the secondary length extends from the secondary shoulder until the secondary nose.

In an embodiment of the pipe connection according to the invention,
the primary shoulder and the secondary nose are configured to be in contact with each other at final make-up of the pipe connection,
the primary nose comprises a first primary nose surface, a second primary nose surface, and a primary retainer surface,
the second primary nose surface is in radial direction relative to the longitudinal axis of the pipe connection located closer to the longitudinal axis than the first primary nose surface,
the first primary nose surface is in axial direction along the longitudinal axis located closer to said one of the first protrusion and the first slot than the second primary nose surface,
the primary retainer surface is in radial direction relative to the longitudinal axis located between the first primary nose surface and the second primary nose surface,
the secondary shoulder comprises a first secondary shoulder surface, a second secondary shoulder surface, and a secondary retainer surface,
the second secondary shoulder surface is in radial direction relative to the longitudinal axis located closer to the longitudinal axis than the first secondary shoulder surface,
the second secondary shoulder surface is in axial direction along the longitudinal axis located closer to said one of the second protrusion and the second slot than the first secondary shoulder surface,
the secondary retainer surface is in radial direction relative to the longitudinal axis located between the first secondary shoulder surface and the second secondary shoulder surface,
the first primary nose surface and the first secondary shoulder surface are configured to have a first clearance between each other at final make-up of the pipe connection, and
the second primary nose surface and the second secondary shoulder surface are configured to have a second clearance between each other at final make-up of the pipe connection.

In an embodiment of the pipe connection according to the invention, the primary retainer surface and the secondary retainer surface are configured to have a third clearance between each other at final make-up of the pipe connection.

In an embodiment of the pipe connection according to the invention, the primary retainer surface and the secondary retainer surface are configured to be in contact with each other at final make-up of the pipe connection.

In an embodiment of the pipe connection according to the invention,
the first primary nose surface and the first secondary shoulder surface extend perpendicular to the longitudinal axis, and
the second primary nose surface and the second secondary shoulder surface extend perpendicular to the longitudinal axis.

In an embodiment of the pipe connection according to the invention,
the primary retainer surface extends under an angle φ of between, and including, 0 degrees and 20, degrees, preferably between, and including, 5 degrees and 15 degrees, relative to the longitudinal axis, and
the secondary retainer surface extends under an angle ε of between, and including, 0 degrees and 20 degrees, preferably between, and including, 5 degrees and 15 degrees, relative to the longitudinal axis.

In an embodiment of the pipe connection according to the invention, the angle φ of the primary retainer surface is smaller than the angle ε of the secondary retainer surface. In a preferred embodiment, the angle φ of the primary retainer surface is slightly smaller, such as 1 degree or less than 1 degree, than the angle ε of the secondary retainer surface.

In an embodiment of the pipe connection according to the invention, the primary retainer surface extends (in radial direction away from the longitudinal axis) towards said one of the first protrusion and the first slot, and the secondary retainer surface extends (in radial direction away from the longitudinal axis) away from said one of the second protrusion and the second slot.

In an embodiment of the pipe connection according to the invention,
the primary shoulder comprises a primary shoulder surface extending under an angle α of between, and including, 80 degrees and 90 degrees, preferably between, and including, 85 degrees and 90 degrees, relative to the longitudinal axis,
the secondary nose comprises a secondary nose surface extending under an angle β of between, and including, 80 degrees and 90 degrees, preferably between, and including, 85 degrees and 90 degrees, relative to the longitudinal axis, and
the primary shoulder surface and the secondary nose surface are configured to be in contact with each other at final make-up of the pipe connection.

In particular, the primary shoulder surface and the secondary nose surface may be aligned.

In an embodiment of the pipe connection according to the invention, the primary shoulder surface extends (in radial direction away from the longitudinal axis) towards said one of the first protrusion and the first slot, and the secondary nose surface extends in (in radial direction away from the longitudinal axis) away from said one of the second protrusion and the second slot.

In an embodiment of the pipe connection according to the invention,
the pipe connection comprises an elastomeric seal, and
the elastomeric seal is in radial direction at final make-up located between the primary alignment sleeve and the secondary alignment sleeve.

In an embodiment of the pipe connection according to the invention, the primary alignment sleeve and/or the secondary alignment sleeve comprise a groove to accommodate the elastomeric seal.

In an embodiment of the pipe connection according to the invention, the elastomeric seal is in axial direction at final make-up located closer to the primary shoulder than to the secondary shoulder.

In an embodiment of the pipe connection according to the invention,
the primary alignment sleeve is in radial direction at final make-up located between the secondary alignment sleeve and the locking ring, and
the primary alignment sleeve is spaced in said radial direction from the locking ring.

The primary nose may be spaced in said radial direction from the locking ring.

In an embodiment of the pipe connection according to the invention,
the secondary alignment sleeve is in radial direction at final make-up located between the primary alignment sleeve and the locking ring, and
the secondary alignment sleeve is spaced in said radial direction from the locking ring.

The secondary nose may be spaced in said radial direction from the locking ring.

In an embodiment of the pipe connection according to the invention,
the first protrusion and the first slot are configured to receive the first protrusion in the first slot over a first radial engagement distance relative to the longitudinal axis,
the second protrusion and second slot are configured to receive the second protrusion in the second slot over a second radial engagement distance relative to the longitudinal axis, and
the first radial engagement distance is larger than the second radial engagement distance.

It will be clear to the skilled person that embodiments of the pipe connection according to the invention may be formed by combining the features of any number of the above defined embodiments of the pipe connection according to the invention.

Figure 2:
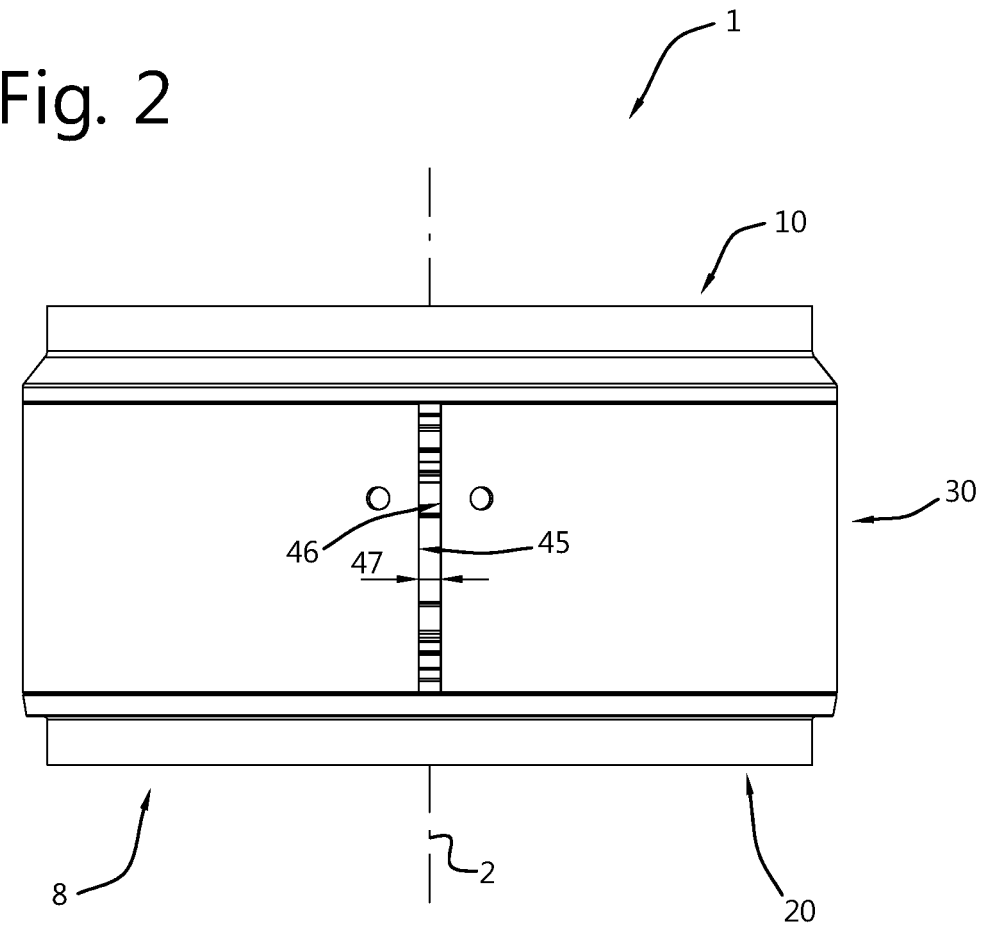
Figure 3:
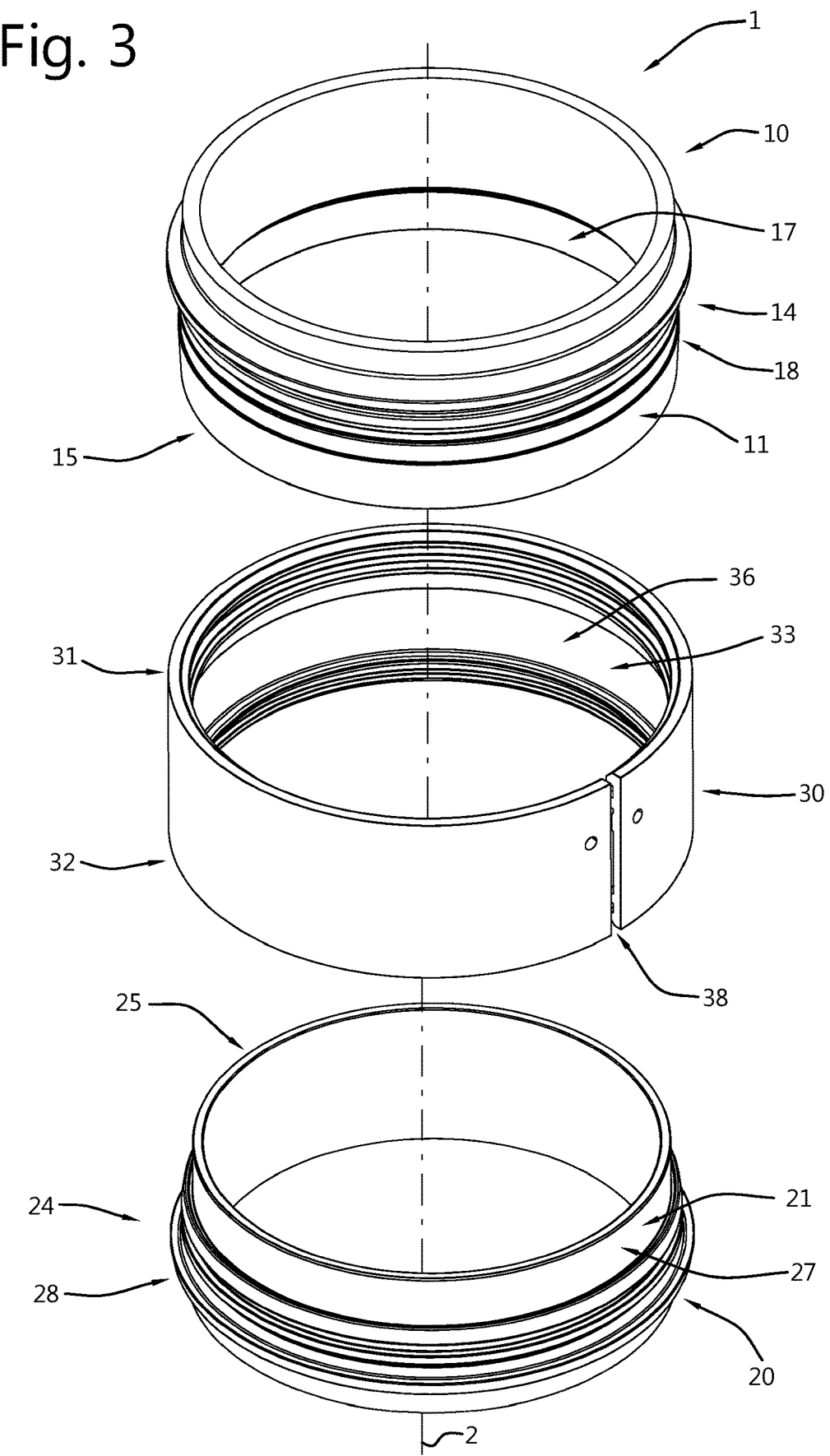
Figure 4:
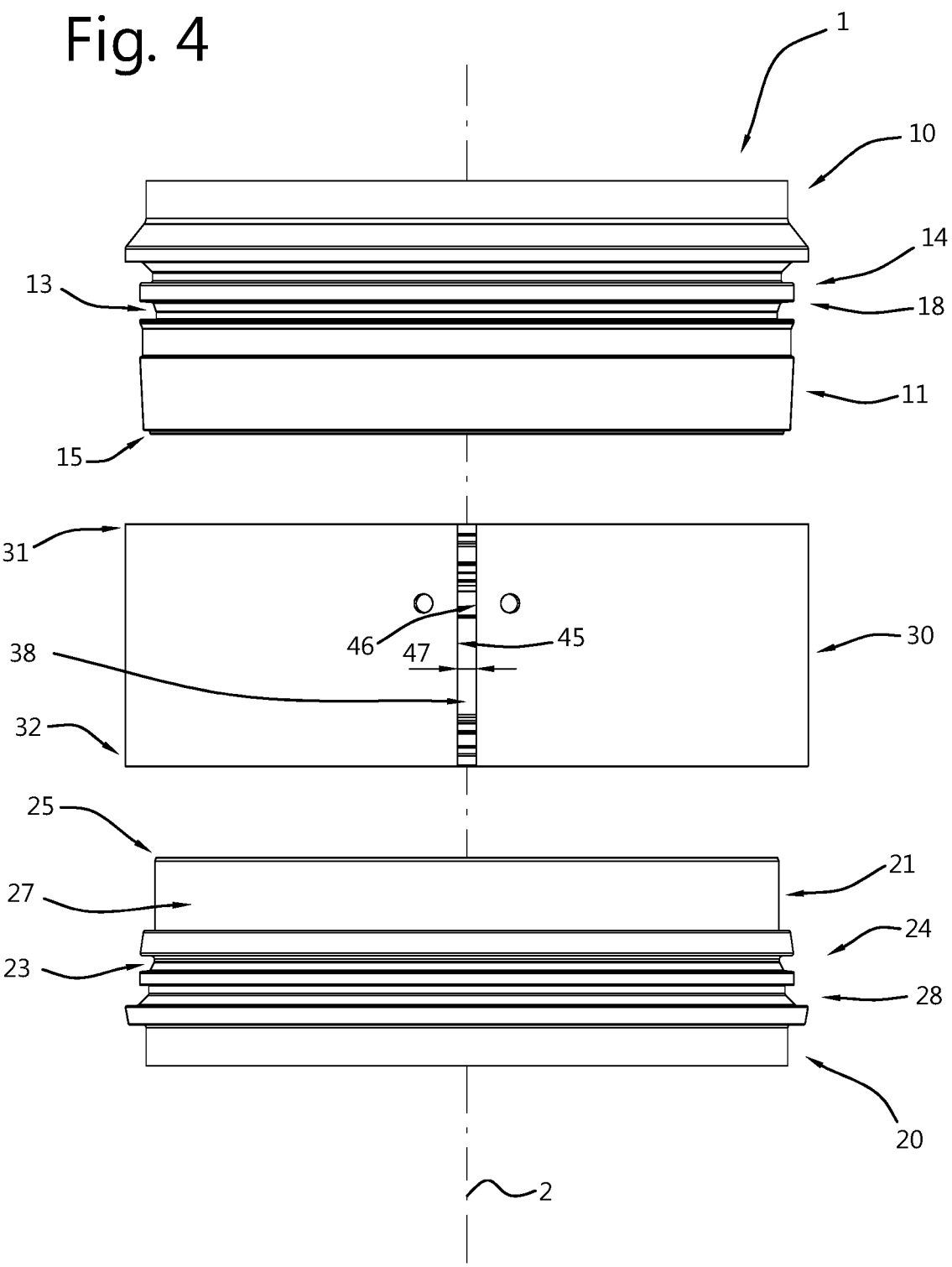
Figure 5:
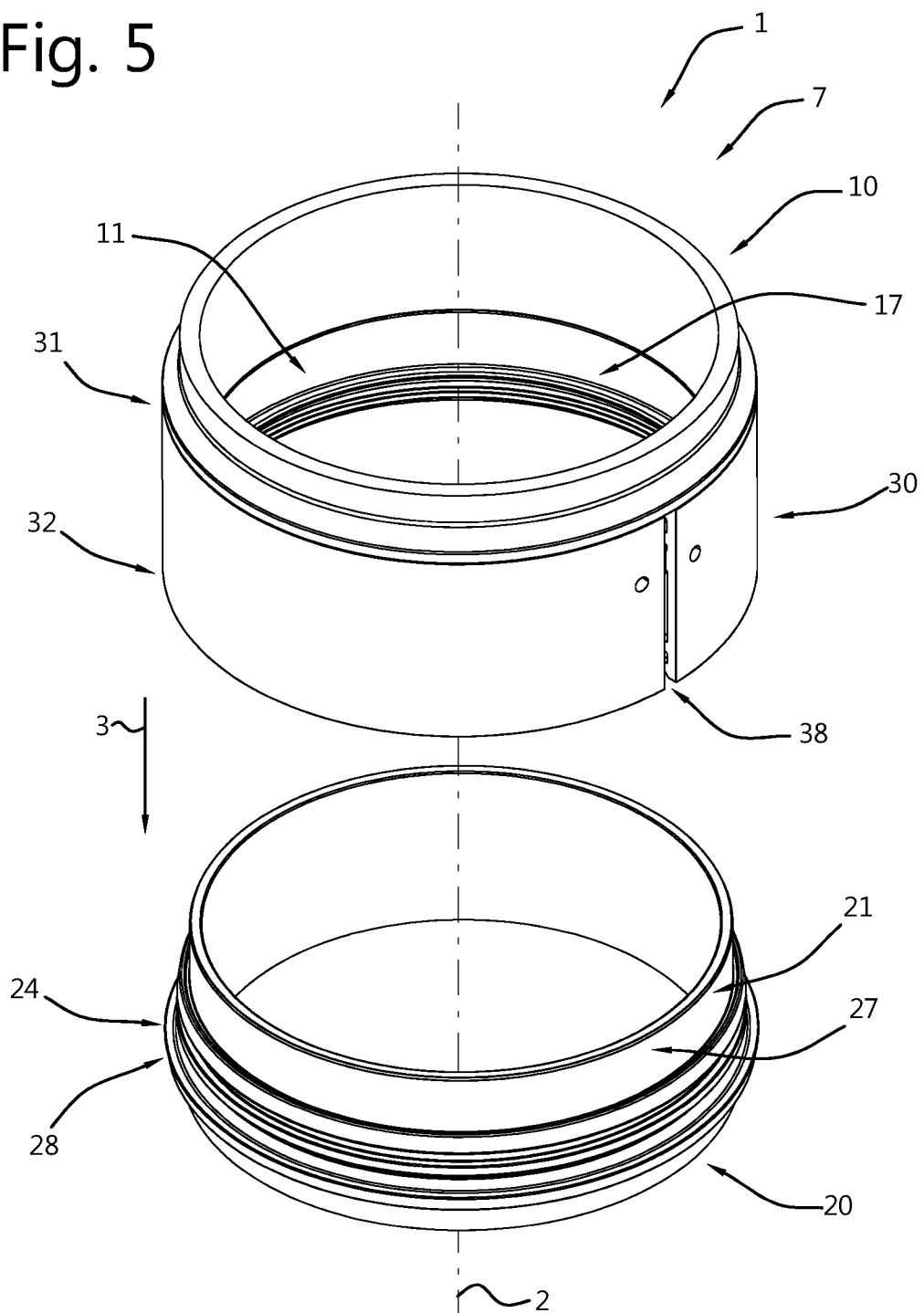
Figure 7A:
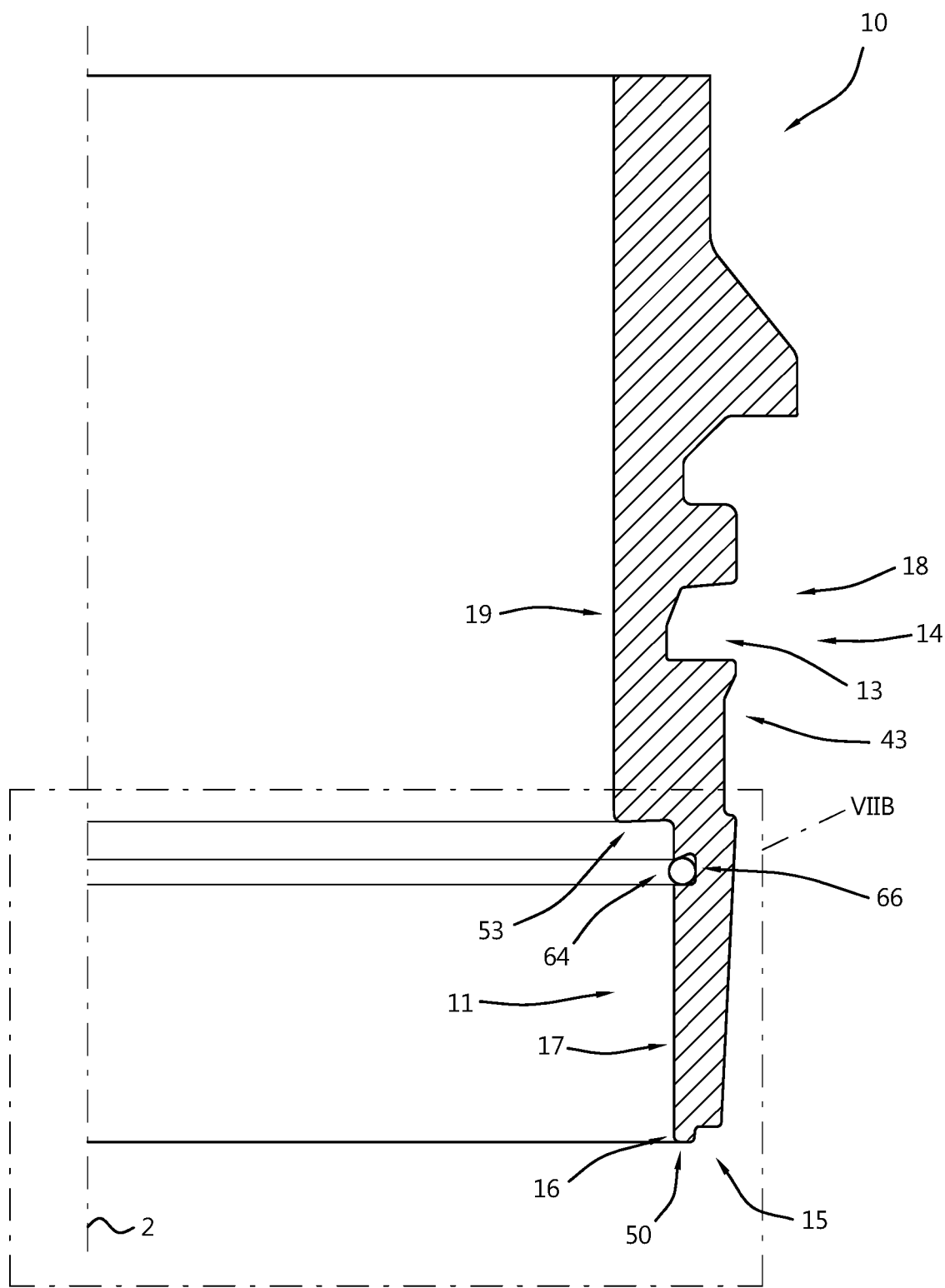
Figure 8A:
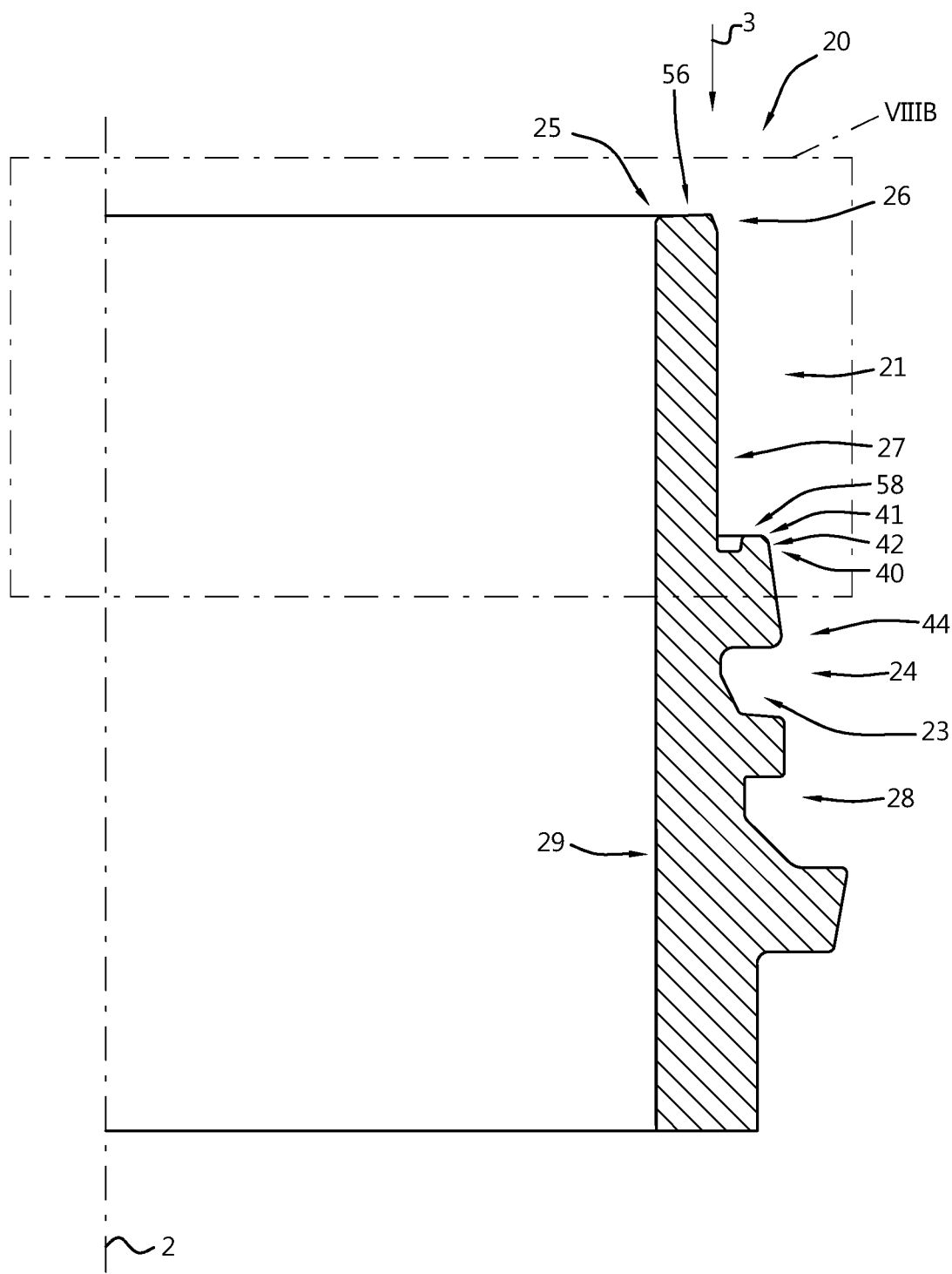
Figure 8B:
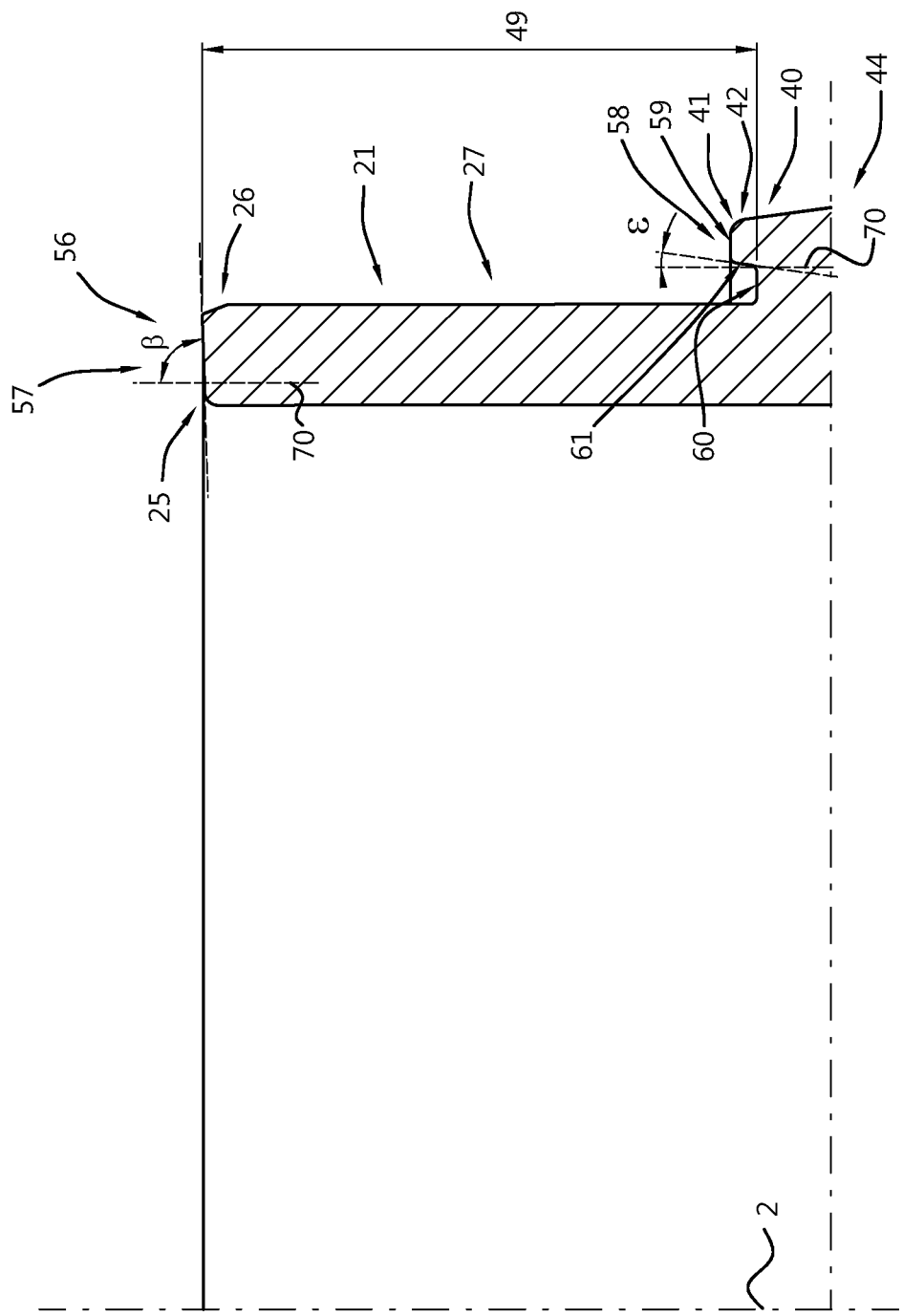
Figure 9:
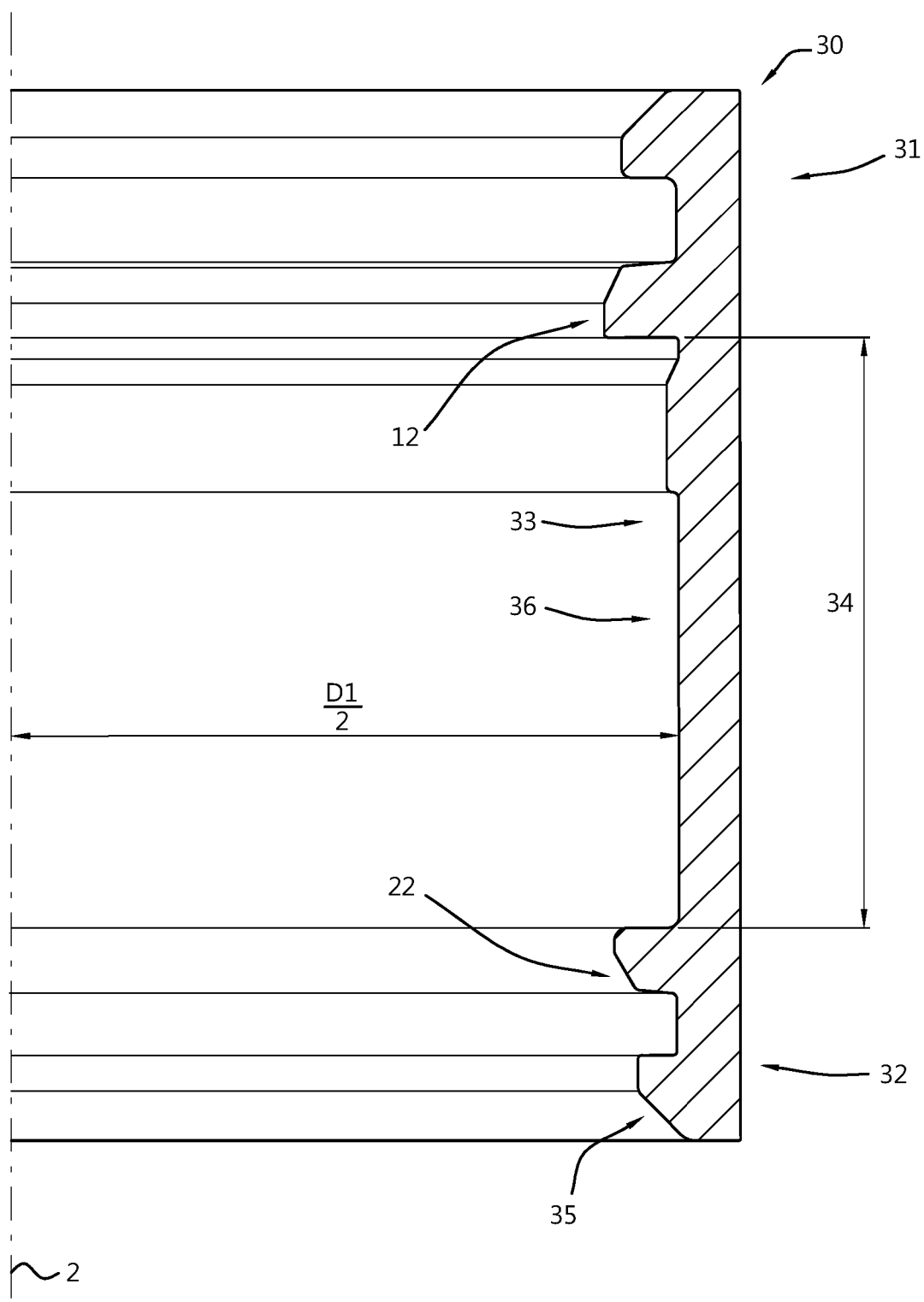
Figure 13:
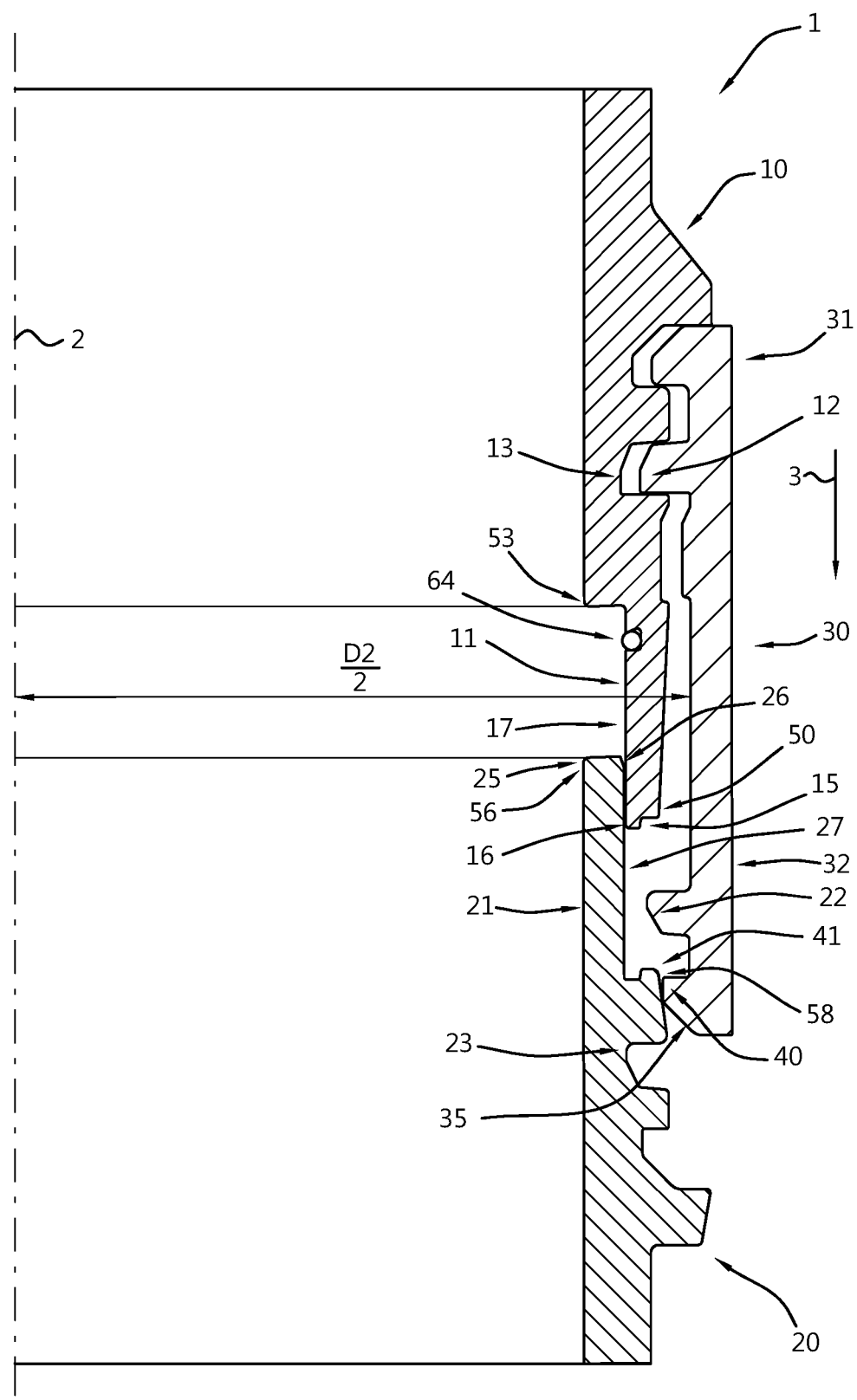
Figure 14:
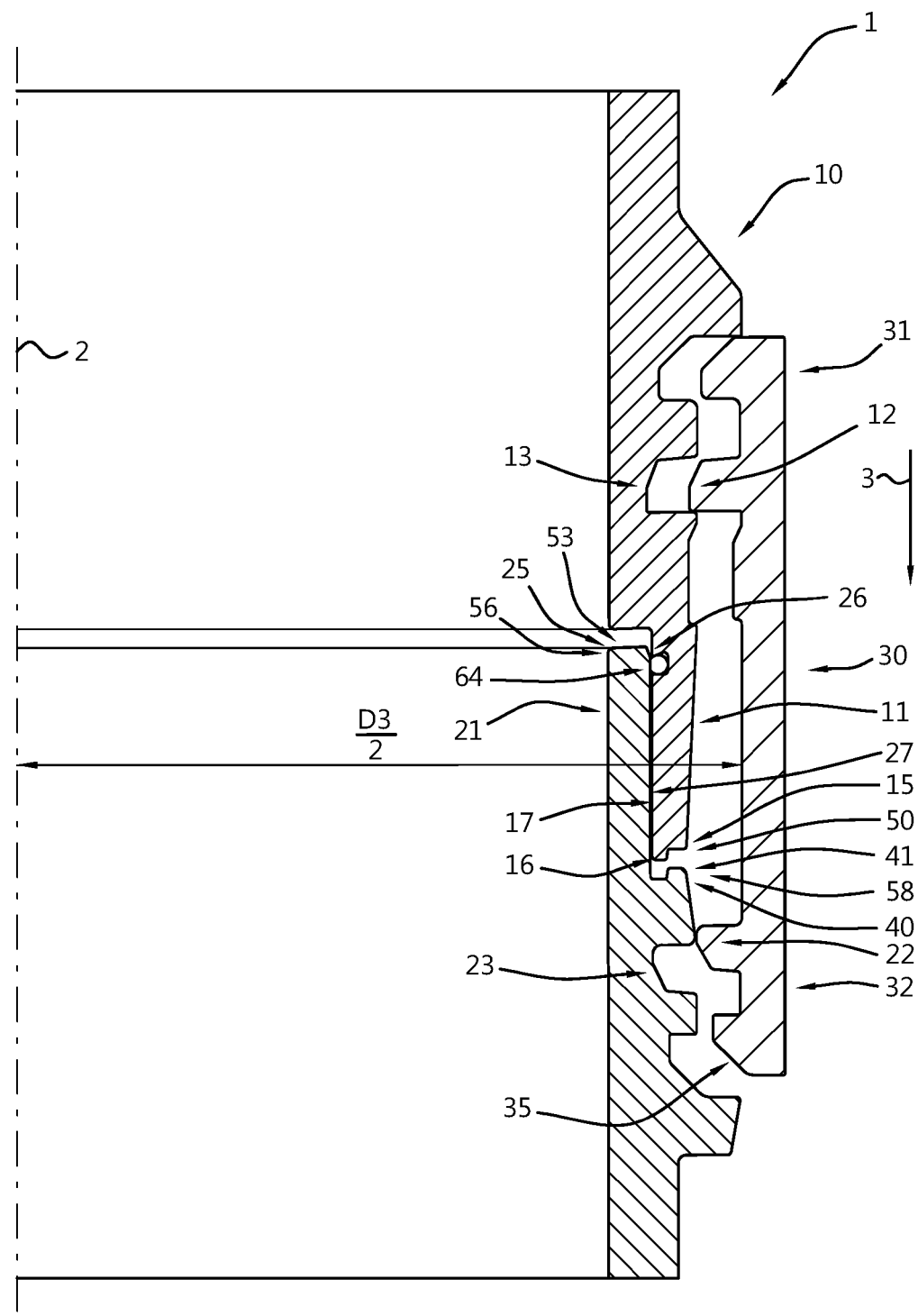
Figure 15A:
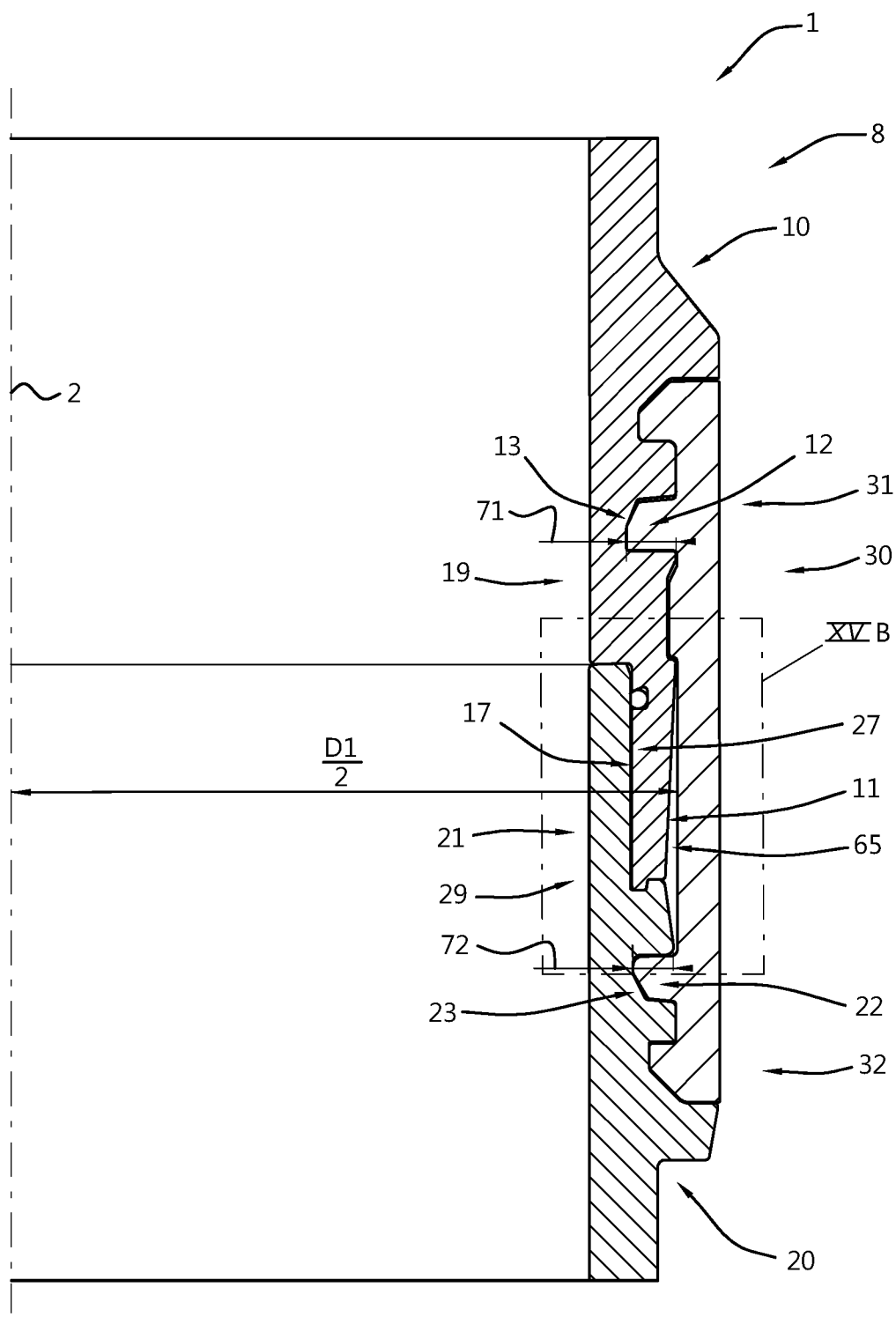
Figure 15B:
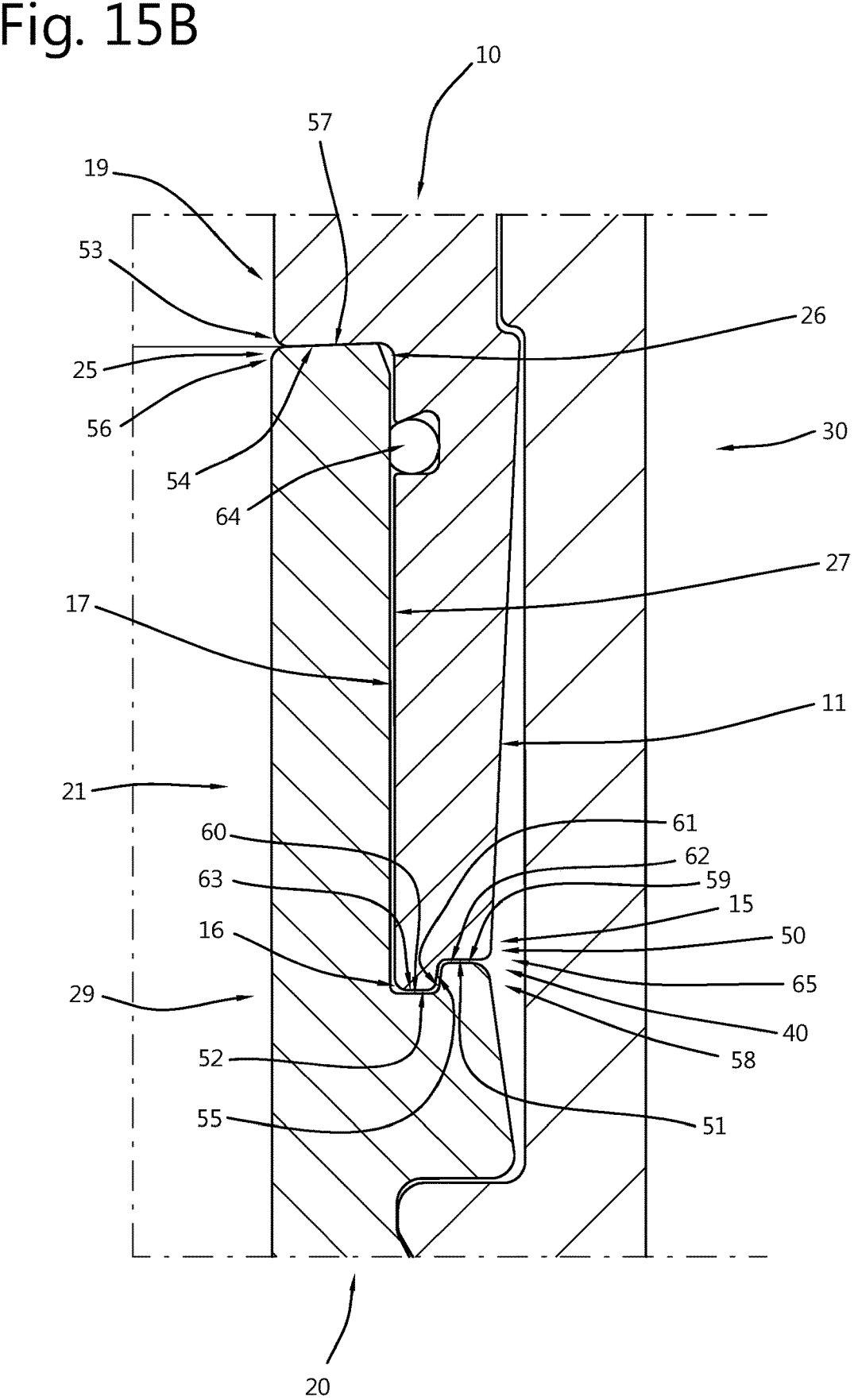

Embodiments of the pipe connection according to the invention will be described by way of example only, with reference to the accompanying schematic drawings in which corresponding reference symbols indicate corresponding parts, and in which:

FIG. 1 schematically shows a view in perspective of an embodiment of a pipe connection according to the invention at final make-up, FIG. 2 schematically shows a side view of the pipe connection of FIG. 1, FIG. 3 schematically shows a view in perspective of the pipe connection of FIG. 1 before make-up, FIG. 4 schematically shows a side view of the pipe connection of FIG. 3, FIG. 5 schematically shows a view in perspective of the pipe connection of FIG. 1 during make-up, FIG. 6 schematically shows a side view of the pipe connection of FIG. 5, FIG. 7A schematically shows a view in cross section of the primary pipe member of the pipe connection of FIG. 1, FIG. 7B schematically shows an enlarged view of part VIIB of FIG. 7A, FIG. 8A schematically shows a view in cross section of the secondary pipe member of the pipe connection of FIG. 1, FIG. 8B schematically shows an enlarged view of part VIIIB of FIG. 8A, FIG. 9 schematically shows a view in cross section of the locking ring of the pipe connection of FIG. 1, the FIGS. 10-14 schematically show views in cross section of the pipe connection of FIG. 1 during make-up, FIG. 15A schematically show a view in cross section of the pipe connection of FIG. 1 at final make-up, and FIG. 15B schematically shows an enlarged view of part XVB of FIG. 15A.

DETAILED DESCRIPTION OF THE FIGURES

FIG. 1 shows a view in perspective of an embodiment of a pipe connection 1 according to the invention at final make-up 8. FIG. 2 shows a side view of the pipe connection 1 of FIG. 1. The FIGS. 15A and 15B show the pipe connection 1 of FIG. 1 in a cross sectional view along the longitudinal axis 2.

The pipe connection 1 is configured for exploration and production of a hydrocarbon well. This type of pipe connection 1 is often used for conductor pipe strings, but may also be used for other types of pipe strings for exploration and production of a hydrocarbon well, such as for a landing string.

The pipe connection 1 comprises a primary pipe member 10, a secondary pipe member 20 and a locking ring 30. At final make-up 8 of the pipe connection 1, the locking ring 30 engages the primary pipe member 10 and the secondary pipe member 20, and the primary pipe member 10, secondary pipe member 20 and the locking ring 30 extend along a longitudinal axis 2. The used terms "axial" and "radial" relate to said longitudinal axis 2.

The primary pipe member 10 comprises an axially extending primary alignment sleeve 11 and a first slot 13. The first slot 13 is provided at a primary circumferential surface 14 of the primary pipe member 10. The primary pipe member 10 is depicted in the FIGS. 3 and 4 showing the pipe connection 1 before make-up. The FIGS. 7A and 7B show the primary pipe member 10 in a cross sectional view along the longitudinal axis 2.

The secondary pipe member 20 comprises an axially extending secondary alignment sleeve 21 and a second slot 23. The second slot 23 is provided at a secondary circumferential surface 24 of the secondary pipe member 20. The secondary pipe member 20 is depicted in the FIGS. 3 and 4 showing the pipe connection 1 before make-up. The FIGS. 8A and 8B show the secondary pipe member 20 in a cross sectional view along the longitudinal axis 2.

The locking ring 30 is resilient in radial direction and comprises a primary ring part 31 having a first protrusion 12, a secondary ring part 32 having a second protrusion 22, and a ring circumferential surface 33. The ring circumferential surface 33 defines a ring diameter. Due to the fact that the locking ring 30 is resilient, the locking ring 30 is able to spring back into shape when being radially stretched to increase the ring diameter or radially compressed to reduce the ring diameter. The first protrusion 12 and the second protrusion 22 are provided at the ring circumferential surface 33 of the locking ring 30 and located at an axial ring distance 34 from each other. The locking ring 30 is depicted in the FIGS. 3 and 4 showing the pipe connection 1 before make-up. FIG. 9 shows the locking ring 30 in a cross sectional view along the longitudinal axis 2.

The locking ring 30 is configured to engage the primary pipe member 10 with the primary ring part 31 by having the first protrusion 12 of the locking ring 30 engaged with the first slot 13 of the primary pipe member 10 (see FIG. 15A).

In other examples of the pipe connection 1 according to the invention (not shown), the primary pipe member comprises a first protrusion, the locking ring comprises a first slot and the locking ring is configured to engage the primary pipe member with the primary ring part by having the first protrusion of the primary pipe member engaged with the first slot of the locking ring.

The locking ring 30 is configured to engage the secondary pipe member 20 with the secondary ring part 32 by having the second protrusion 22 of the locking ring 30 engaged with the second slot 23 of the secondary pipe member 20 (see FIG. 15A).

In other examples of the pipe connection 1 according to the invention (not shown), the secondary pipe member comprises a second protrusion, the locking ring comprises a second slot and the locking ring is configured to engage the secondary pipe member with the secondary ring part by having the second protrusion of the secondary pipe member engaged with the second slot of the locking ring.

The secondary pipe member 20 comprises an adjustment portion 40 provided at the secondary circumferential surface 24 to elastically adjust the ring diameter at the secondary ring part 32 of the locking ring 30 in order to facilitate engagement of the second protrusion 22 of the locking ring 30 with the second slot 23 of the secondary pipe member 20 during make-up of the pipe connection 1. This will be explained in detail with reference to the FIGS. 10-15. During said make-up of the pipe connection 1, the locking ring 30 being engaged with the primary pipe member 10 is moved in axial direction towards the secondary pipe member 20. The locking ring 30 comprises an axially extending opening 38 to facilitate the adjustment of the ring diameter. In particular, the locking ring 30 has a non-endless circular cross section. The circular cross section of the locking ring 30 starts at a first end 45, and ends at an opposite second end 46, wherein the first end 45 and the second end 46 face each other. The first end 45 and the second end 46 define the opening 38 between said first and second ends 45, 46. More in particular, the first end 45 and the second end 46 are located at a ring circumferential distance 47 of between, and including, 10 mm to 30 mm, even more in particular between, and including, 15 mm to 25 mm, from each other.

The primary alignment sleeve 11 and the secondary alignment sleeve 21 are of substantially equal length and configured to, during said make-up of the pipe connection 1, overlap each other in axial direction for alignment of the primary pipe member 10 and the secondary pipe member 20 before the locking ring 30 contacts the adjustment portion 40 of the secondary member.

The locking ring 30 being engaged with the primary pipe member 10 is during make-up moved in axial direction towards the secondary pipe member 20 in order to attach the locking ring 30 to the secondary pipe member 20. The FIGS. 5 and 6 show the situation in which the locking ring 30 is engaged with the primary pipe member 10 and positioned above the secondary pipe member 20. The engaged primary pipe member 10 and locking ring 30 will be moved in the axial direction indicated by arrow 3 toward the secondary pipe member 20. This is depicted in the FIGS. 10-14 showing the pipe connection 1 in cross sectional views along the longitudinal axis 2.

Figure 10:
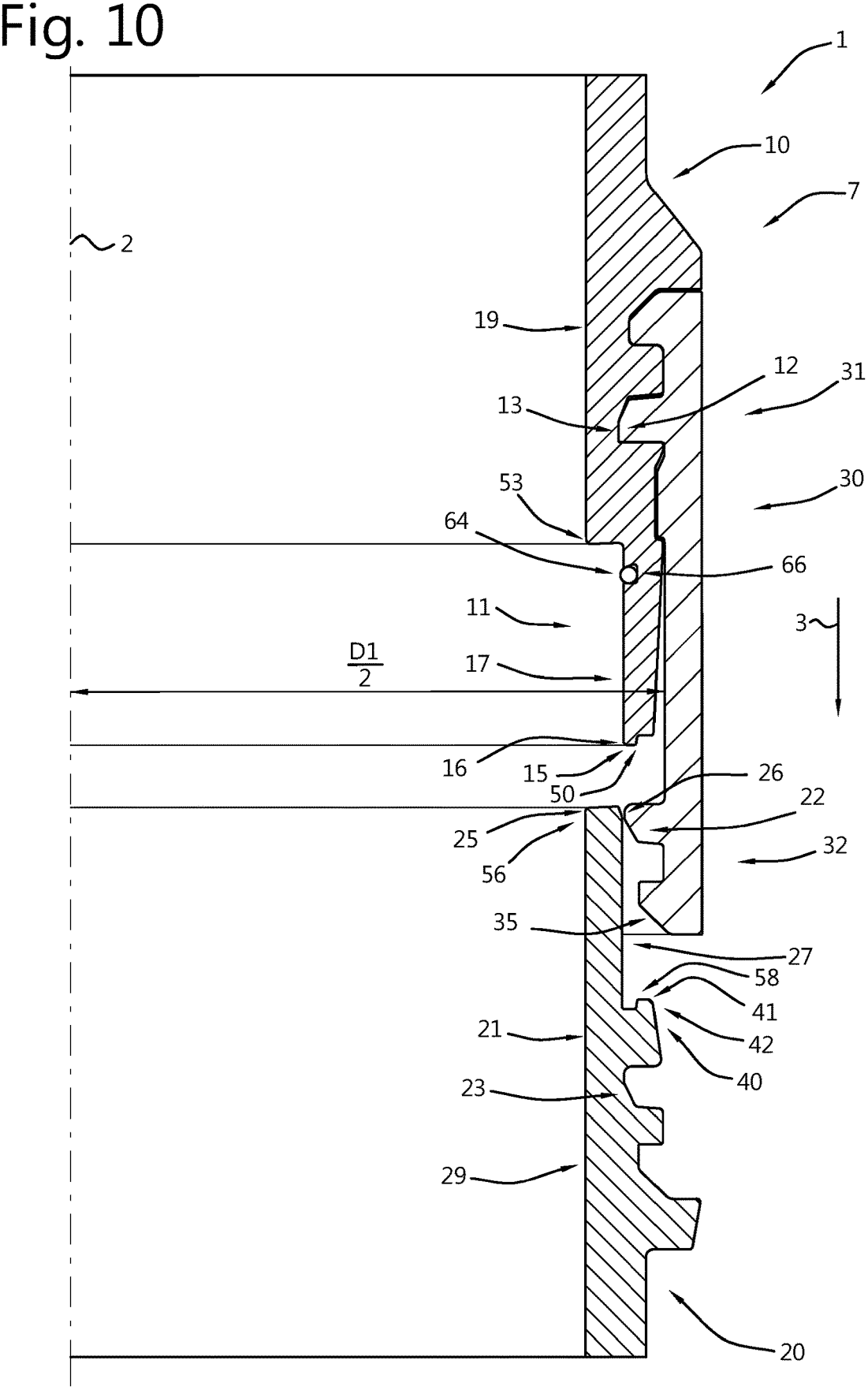

In FIG. 10, the engaged primary pipe member 10 and locking ring 30 are moved further in the axial direction of arrow 3 towards the secondary pipe member 20 when compared with the FIGS. 5 and 6. The first protrusion 12 of the locking ring 30 engages with the first slot 13 of the primary pipe member 10. The ring diameter of the locking ring 30 is indicated by D1.

Figure 11:
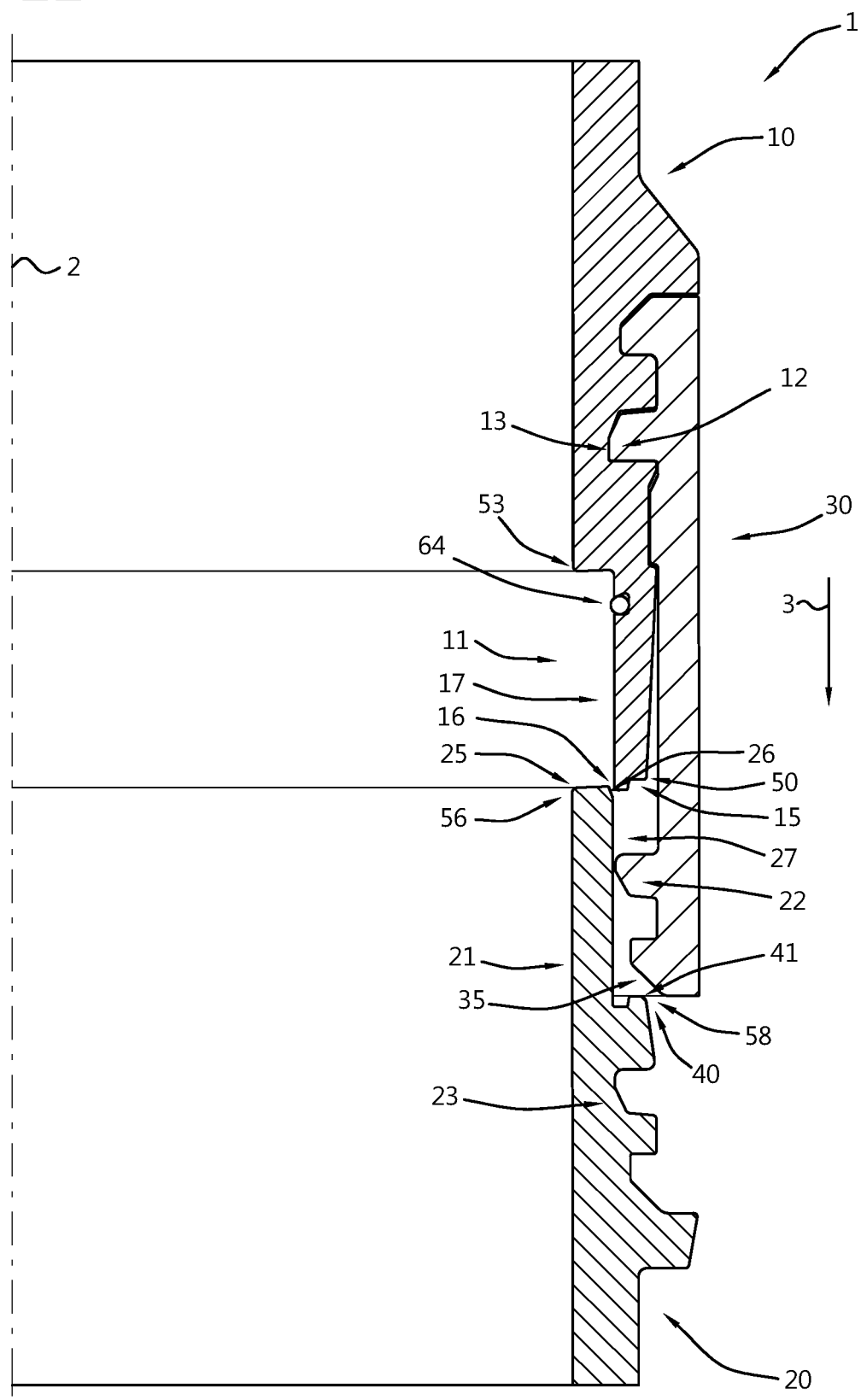

In FIG. 11, the engaged primary pipe member 10 and locking ring 30 are moved further in the axial direction of arrow 3 when compared with FIG. 10. The primary alignment sleeve 11 and the secondary alignment sleeve 21 start to overlap each other in axial direction for alignment of the primary pipe member 10 and the secondary pipe member 20. The locking ring 30 has not yet been in contact with the adjustment portion 40 of the secondary member.

Figure 12:
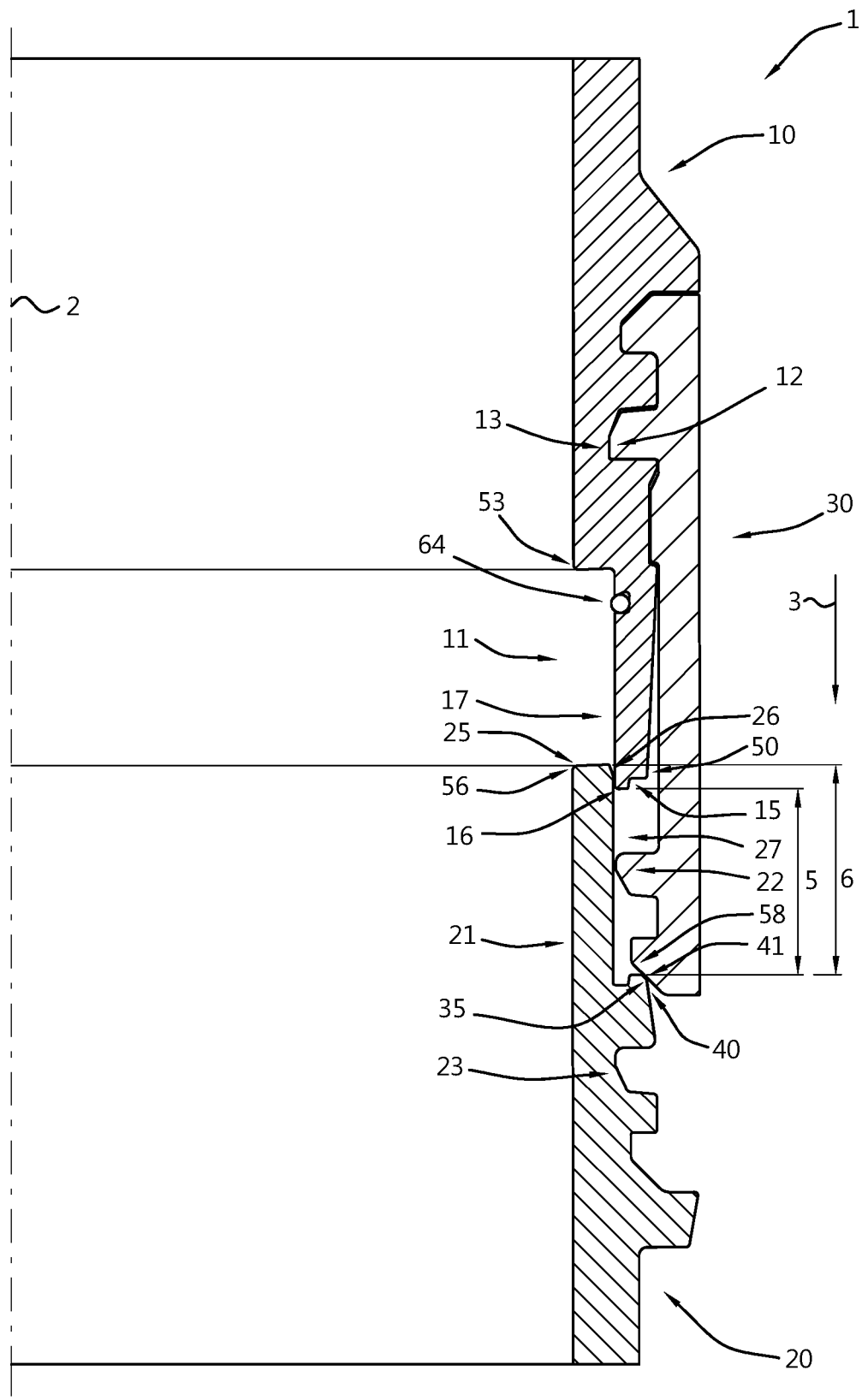

In FIG. 12, the engaged primary pipe member 10 and locking ring 30 are moved further in the axial direction of arrow 3 when compared with FIG. 11. The locking ring 30 makes first contact with the adjustment portion 40 of the secondary member. The degree of overlapping of the primary alignment sleeve 11 and the secondary alignment sleeve 21 in axial direction has increased.

In FIG. 13, the engaged primary pipe member 10 and locking ring 30 are moved further in the axial direction of arrow 3 when compared with FIG. 12. The adjustment portion 40 of the secondary pipe member 20 has elastically adjusted the ring diameter at the secondary ring part 32 of the locking ring 30 in order to facilitate engagement of the second protrusion 22 of the locking ring 30 with the second slot 23 of the secondary pipe member 20 during make-up of the pipe connection 1. More specifically, the ring diameter has been increased by the adjustment portion 40, which pushes the secondary ring part 32 radially outwards thereby increasing the opening 38 of the locking ring 30. The ring diameter is elastically adjusted by the influence of forces of the adjustment portion 40 acting on the secondary ring part 32 of the locking ring 30 when the locking ring 30 and the primary pipe member 10 are moved in axial direction towards the secondary pipe member 20. The weight of the primary pipe member 10 is used to facilitate the adjustment of the ring diameter. The adjusted ring diameter is indicated by D2. In the shown situation, the ring diameter of the complete locking ring 30 has been adjusted to D2. In other examples of the pipe connection 1 according to the invention, the ring diameter at the secondary ring part 32 is increased at a larger degree than the ring diameter at the primary ring part 31.

The primary pipe member 10 typically has a mass between 5000 and 13000 kg. The alignment of the primary pipe member 10 and the secondary pipe member 20 provided by the primary alignment sleeve 11 and the second alignment sleeve 21 also tends to reduce the damage to the pipe connection 1 if during the make-up process the primary pipe member 10 is (accidentally) dropped onto the secondary pipe member 20.

In FIG. 14, the engaged primary pipe member 10 and locking ring 30 are moved further in the axial direction of arrow 3 when compared with FIG. 13. The ring diameter of the locking ring 30 has been adjusted further by the adjustment portion 40. The further adjusted ring diameter is indicated by D3. The second protrusion 22 of the locking ring 30 is about to engage with the second slot 23 of the secondary pipe member 20.

In FIG. 15A, the engaged primary pipe member 10 and locking ring 30 are moved further in the axial direction of arrow 3 when compared with FIG. 14 and final make-up 8 of the pipe connection 1 has been reached. The locking ring 30 engages the primary pipe member 10 and the secondary pipe member 20. The second protrusion 22 of the locking ring 30 engages with the second slot 23 of the secondary pipe member 20. The ring diameter of the locking ring 30 is back to D1.

The overlapping primary alignment sleeve 11 and the secondary alignment sleeve 21 align the primary pipe member 10 and the secondary pipe member 20 during the make-up of the pipe connection 1. By ensuring that the primary alignment sleeve 11 and the secondary alignment sleeve 21 overlap before the locking ring 30 contacts the adjustment portion 40 of the secondary member, the primary pipe member 10 and the secondary pipe member 20 are aligned when the ring diameter of the locking ring 30 is elastically adjusted in order to facilitate engagement of the secondary pipe member 20 with the locking ring 30. Having the primary pipe member 10 and the secondary pipe member 20 aligned during the part of said make-up in which the locking ring 30 is adjusted and placed in engagement with the secondary pipe member 20 reduces the risk that the locking ring 30 engages the secondary pipe member 20 incorrectly after make-up has finished. More specifically, the risk that the second protrusion 22 of the locking ring 30 incorrectly engages with the second slot 23 of the secondary pipe member 20 is reduced. As a result, a more reliable pipe connection 1 is obtained.

The pipe connection 1 tends to have a reduced risk of creating damage to the secondary pipe member 20, more specifically the adjustment portion 40, and/or the locking ring 30 during make-up. Said damage reduces the number of times that the pipe connection 1 can be disconnected and re-used. By ensuring that the primary pipe member 10 and the secondary pipe member 20 are aligned before the secondary pipe member 20, more specifically the adjustment portion 40, and the locking ring 30 come into contact during make-up, forces are more equally distributed when the locking ring 30 and the secondary pipe member 20 come in contact with each other. This is amongst others relevant since the weight of the primary pipe member 10 is during make-up released onto the locking ring 30 and the secondary pipe member 20.

The primary alignment sleeve 11 comprises a primary pipe end 15 of the primary pipe member 10. The secondary alignment sleeve 21 comprises a secondary pipe end 25 of the secondary pipe member 20. The primary pipe end 15 is in axial direction positioned beyond the secondary pipe end 25 when the primary pipe member 10 and the secondary pipe member 20 overlap each other (see the FIGS. 11-15).

The locking ring 30 comprises a first contact ring area 35 configured to make first contact with the adjustment portion 40 of the secondary pipe member 20 to adjust the ring diameter at the secondary ring part 32 during said make-up of the pipe connection 1. The adjustment portion 40 comprises a first contact portion area 41 configured to make first contact with the locking ring 30, more specifically the first contact ring area 35, to adjust the ring diameter at the secondary ring part 32 during said make-up of the pipe connection 1. The primary alignment sleeve 11 comprises a first overlap primary sleeve area 16 which overlaps as first the secondary alignment sleeve 21 during said make-up of the pipe connection 1. The secondary alignment sleeve 21 comprises a first overlap secondary sleeve area 26 which overlaps as first the primary alignment sleeve 11, more specifically the first overlap primary sleeve area 16, during said make-up of the pipe connection 1. A first axial distance 5 between the first contact ring area 35 and the first overlap primary sleeve area 16 of the locking ring 30 being engaged to the primary pipe member 10 is shorter than a second axial distance 6 between the first contact portion area 41 and the first overlap secondary sleeve area 26 (see FIGS. 11 and 12). The used term "area" refers to a section of a surface of a body. For example, the first contact ring area 35 of the locking ring 30 refers to the section of the ring internal circumferential surface 36 configured to make first contact with the adjustment portion 40 of the secondary pipe member 20.

Said first axial distance 5 and said second axial distance 6 overlap in axial direction 3 (see FIG. 12). More specifically, said second axial distance 6 overlaps said first axial distance 5 completely in axial direction 5.

The primary alignment sleeve 11 comprises a primary alignment surface 17. The secondary alignment sleeve 21 comprises a secondary alignment surface 27. The primary alignment sleeve 11 and the secondary alignment sleeve 21 are configured to overlap with the primary alignment surface 17 and the secondary alignment surface 27 facing each other.

The primary alignment surface 17 and the secondary alignment surface 27 are configured to slide along each other during make-up of the pipe connection 1.

The primary circumferential surface 14 of the primary pipe member 10 is a primary external circumferential surface 18. The secondary circumferential surface 24 of the primary pipe member 10 is a secondary external circumferential surface 28. The ring circumferential surface 33 of the locking ring 30 is a ring internal circumferential surface 36. The adjustment portion 40 is an external adjustment portion 42 configured to increase the ring diameter of the secondary ring part 32 of the locking ring 30 (see the FIGS. 10-15).

The primary pipe member 10 comprises a primary internal circumferential surface 19. The secondary pipe member 20 comprises a secondary internal circumferential surface 29. The primary internal circumferential surface 19 and the secondary internal circumferential surface 29 are flush with each other.

The pipe connection 1 is free from any items provided at the primary internal circumferential surface 19 and the secondary internal circumferential surface 29 forming an obstruction in axial direction 3. This way it is ensured that no obstructions are provided for a fluid flowing through the pipe connection 1.

In other examples of the pipe connection 1 according to the invention (not shown), the primary circumferential surface of the primary pipe member is a primary internal circumferential surface. The secondary circumferential surface of the primary pipe member is a secondary internal circumferential surface. The ring circumferential surface of the locking ring 30 is a ring external circumferential surface. The adjustment portion is an internal adjustment portion configured to decrease the ring diameter of the secondary ring part of the locking ring. The primary pipe member comprises a primary external circumferential surface. The secondary pipe member comprises a secondary external circumferential surface. The primary external circumferential surface and the secondary external circumferential surface are flush with each other. The pipe connection is free from any items provided at the primary external circumferential surface and the secondary external circumferential surface forming an obstruction in axial direction. This way it ensured that no obstructions are provided to lower the pipe connection into the hydrocarbon well.

The secondary alignment sleeve 21 is located closer to the longitudinal axis 2 than the primary alignment sleeve 11. The secondary alignment sleeve 21 may therefore be free from forces as a result of the secondary pipe member 20 contacting the locking ring 30 during make-up.

The primary alignment sleeve 11 is in radial direction at final make-up 8 located between the secondary alignment sleeve 21 and the locking ring 30.

The primary alignment sleeve 11 is located closer to the secondary alignment sleeve 21 than the locking ring 30. More specifically, the primary alignment sleeve 11 is located closer to the secondary alignment sleeve 21 than the ring circumferential surface 33 defining the ring diameter D. Even more specifically, the primary alignment sleeve 11 is located closer to the secondary alignment sleeve 21 than the ring internal circumferential surface 36.

The primary pipe member 10 comprises a primary member body 43 having the first slot 13. The secondary pipe member 20 comprises a secondary member body 44 having the second slot 23. The primary alignment sleeve 11 extends away from the primary member body 43. The secondary alignment sleeve 21 extends away from the secondary member body 44. The adjustment portion 40 is provided at the secondary member body 44. More specifically, the adjustment portion 40 is formed as not being part of the secondary alignment sleeve 21. This allows that during make-up, forces caused by contact with the locking ring 30 can be transferred through the secondary pipe member 20 at a distance from the secondary alignment sleeve 21. The primary member body 43 and the primary alignment sleeve 11 are integrally formed. The secondary member body 44 and the secondary alignment sleeve 21 are integrally formed.

The primary alignment sleeve 11 has a primary length 48 in axial direction 3. The secondary alignment sleeve 21 has a secondary length 49 in axial direction 3. The primary length 48 and the secondary length 49 are substantially equal to each other.

The primary alignment sleeve 11 comprises a primary nose 50. The secondary alignment sleeve 21 comprises a secondary nose 56. The primary pipe member 10 comprises a primary shoulder 53. The secondary pipe member 20 comprises a secondary shoulder 58. The adjustment portion 40 is provided at the secondary shoulder 58. This facilitates that during make-up, forces caused by contact with the locking ring 30 can be transferred through the secondary pipe member 20 at a distance from the secondary alignment sleeve 21. Further details are depicted in FIG. 15B.

The primary nose 50 is at final make-up 8 adjacent to the secondary shoulder 58, and the primary shoulder 53 is at final make-up 8 adjacent to the secondary nose 56.

The primary length 48 extends from the primary shoulder 53 until the primary nose 50. The secondary length 49 extends from the secondary shoulder 58 until the secondary nose 56.

The primary shoulder 53 and the secondary nose 56 are configured to be in contact with each other at final make-up 8 of the pipe connection 1.

The primary nose 50 comprises a first primary nose surface 51, a second primary nose surface 52, and a primary retainer surface 55. The second primary nose surface 52 is in radial direction relative to the longitudinal axis 2 of the pipe connection 1 located closer to the longitudinal axis 2 than the first primary nose surface 51. The first primary nose surface 51 is in axial direction along the longitudinal axis 2 located closer to the first slot 13 than the second primary nose surface 52. The primary retainer surface 55 is in radial direction relative to the longitudinal axis 2 located between the first primary nose surface 51 and the second primary nose surface 52.

The secondary shoulder 58 comprises a first secondary shoulder surface 59, a second secondary shoulder surface 60, and a secondary retainer surface 61. The second secondary shoulder surface 60 is in radial direction relative to the longitudinal axis 2 located closer to the longitudinal axis 2 than the first secondary shoulder surface 59. The second secondary shoulder surface 60 is in axial direction along the longitudinal axis 2 located closer to the second slot 23 than the second secondary shoulder surface 60. The secondary retainer surface 61 is in radial direction relative to the longitudinal axis 2 located between the first secondary shoulder surface 59 and the second secondary shoulder surface 60.

The first primary nose surface 51 and the first secondary shoulder surface 59 are configured to have a first clearance 62 between each other at final make-up 8 of the pipe connection 1.

The second primary nose surface 52 and the second secondary shoulder surface 60 are configured to have a second clearance 63 between each other at final make-up 8 of the pipe connection 1.

The primary retainer surface 55 and the secondary retainer surface 61 reduces the risk of jump-out when the pipe connection 1 is subjected to bending.

By ensuring that the primary alignment sleeve 11 and the secondary alignment sleeve 21 overlap before the locking ring 30 contacts the adjustment portion 40 of the secondary member a better aligned pipe connection 1 is obtained at final make-up 8. Such a better aligned pipe connection 1 in combination with the primary shoulder 53 and the secondary nose 56 being in contact with each other, a first clearance 62 provided between the first primary nose surface 51 and the first secondary shoulder surface 59, and a second clearance 63 provided between the second primary nose surface 52 and the second secondary shoulder surface 60 ensures that a better force distribution is obtained in the pipe connection 1 at final make-up 8.

The primary retainer surface 55 and the secondary retainer surface 61 are configured to have a third clearance between each other at final make-up 8 of the pipe connection 1. In other examples of the pipe connection 1 according to the invention, the primary retainer surface 55 and the secondary retainer surface 61 are configured to be in contact with each other at final make-up 8 of the pipe connection 1 at final make-up 8 of the pipe connection 1.

The first primary nose surface 51 and the first secondary shoulder surface 59 extend perpendicular to the longitudinal axis 2. The second primary nose surface 52 and the second secondary shoulder surface 60 extend perpendicular to the longitudinal axis 2.

The primary retainer surface 55 extends under an angle φ of between, and including, 0 degrees and 20, degrees, preferably between, and including, 5 degrees and 15 degrees, relative to the longitudinal axis 2. The secondary retainer surface 61 extends under an angle ε of between, and including, 0 degrees and 20 degrees, preferably between, and including, 5 degrees and 15 degrees, relative to the longitudinal axis 2. The primary retainer surface 55 extends (in radial direction away from the longitudinal axis) towards the first slot 13. The secondary retainer surface 61 extends in radial direction away from the second slot 23.

The primary shoulder 53 comprises a primary shoulder surface 54 extending under an angle α of between, and including, 80 degrees and 90 degrees, preferably between, and including, 85 degrees and 90 degrees, relative to the longitudinal axis 2. The secondary nose 56 comprises a secondary nose surface 57 extending under an angle β of between, and including, 80 degrees and 90 degrees, preferably between, and including, 85 degrees and 90 degrees, relative to the longitudinal axis 2. The primary shoulder surface 54 and the secondary nose surface 57 are configured to be in contact with each other at final make-up 8 of the pipe connection 1. The primary shoulder surface 54 and the secondary nose surface 57 are aligned. The primary shoulder surface 54 extends in (in radial direction away from the longitudinal axis) towards the first slot 13. The secondary nose surface 57 extends in radial direction away from the second slot 23.

The above described angles are shown in the FIGS. 7B and 8B with respect to virtual lines 70 extending parallel with the longitudinal axis 2.

The pipe connection 1 comprises an elastomeric seal 64. The elastomeric seal 64 is in radial direction at final make-up 8 located between the primary alignment sleeve 11 and the secondary alignment sleeve 21. The primary alignment sleeve 10 comprises a groove 66 to accommodate the elastomeric seal 64. A better sealing of the elastomeric seal 64 is obtained by the angle α of the primary shoulder surface 54 and the angle β of the secondary nose surface 57 when there is axial compression in the pipe connection 1. The elastomeric seal 64 is in axial direction at final make-up 8 located closer to the primary shoulder 53 than to the secondary shoulder 58.

The primary alignment sleeve 11 is in radial direction at final make-up 8 located between the secondary alignment sleeve 21 and the locking ring 30. The primary alignment sleeve 11 is spaced in said radial direction from the locking ring 30. This allows some relative displacement of the locking ring 30 when a bending moment is applied to the pipe connection 1 at final make-up 8, thereby reducing the risk of jump-out. A space 65 is provided between the primary alignment sleeve 11 and the locking ring 30. The primary nose 50 is spaced in said radial direction from the locking ring 30.

In other examples of the pipe connection 1 according to the invention (not shown), the secondary alignment sleeve is in radial direction at final make-up located between the primary alignment sleeve and the locking ring, and the secondary alignment sleeve is spaced in said radial direction from the locking ring. In said situation, a space is provided between the secondary alignment sleeve and the locking ring. The secondary nose may be spaced in said radial direction from the locking ring.

The first protrusion 12 and the first slot 13 are configured to receive the first protrusion 12 in the first slot 13 at final make-up 8 over a first radial engagement distance 71 relative to the longitudinal axis 2. The second protrusion 22 and second slot 23 are configured to receive the second protrusion 22 in the second slot 23 at final make-up 8 over a second radial engagement distance 72 relative to the longitudinal axis 2. The first radial engagement distance 71 is larger than the second radial engagement distance 72 (see FIG. 15A). As a result, the overlap in radial direction between the first protrusion 12 in the first slot 13 is larger than the overlap in radial direction between the second protrusion 22 and second slot 23. This facilitates that the locking ring 30 remains engaged with the primary pipe member 10 due to the fact that part of the first protrusion 12 remains located in the first slot 13 when the ring diameter is adjusted during make-up (see FIG. 14).

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The terms multiple and plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

It will be apparent to those skilled in the art that various modifications can be made to the pipe connection according to the invention shown the figures without departing from the scope as defined in the claims.

The invention claimed is:

1. A pipe connection for exploration and production of a hydrocarbon well, said pipe connection comprising:
a primary pipe member comprising an axially extending primary alignment sleeve and one of a first protrusion and a first slot, wherein said one of the first protrusion and the first slot is provided at a primary circumferential surface of the primary pipe member,
a secondary pipe member comprising an axially extending secondary alignment sleeve and one of a second protrusion and a second slot, wherein said one of the second protrusion and the second slot is provided at a secondary circumferential surface of the secondary pipe member, and
a locking ring being resilient in radial direction and comprising a primary ring part having the other of the first protrusion and the first slot, a secondary ring part having the other of the second protrusion and the second slot, and a ring circumferential surface defining a ring diameter, wherein said other of the first protrusion and the first slot and said other of the second protrusion and the second slot are provided at the ring circumferential surface of the locking ring and located at an axial ring distance from each other, and wherein:
the locking ring is configured to engage the primary pipe member with the primary ring part by having said one of the first protrusion and the first slot of the primary pipe member engaged with said other of the first protrusion and the first slot of the locking ring,
the locking ring is configured to engage the secondary pipe member with the secondary ring part by having said one of the second protrusion and the second slot of the secondary pipe member engaged with said other of the second protrusion and the second slot of the locking ring,
the secondary pipe member comprises an adjustment portion provided at the secondary circumferential surface to elastically adjust the ring diameter at the secondary ring part of the locking ring in order to facilitate engagement of said one of the second protrusion and the second slot of the secondary pipe member with said other of the second protrusion and the second slot of the locking ring during make-up of the pipe connection in which the locking ring being engaged with the primary pipe member is moved in axial direction towards the secondary pipe member,
the primary alignment sleeve and the secondary alignment sleeve are of substantially equal length and configured to during said make-up of the pipe connection overlap each other in axial direction for alignment of the primary pipe member and the secondary pipe member before the locking ring contacts the adjustment portion of the secondary member,
the primary pipe member comprises a primary member body having said one of the first protrusion and the first slot,
the secondary pipe member comprises a secondary member body having said one of the second protrusion and the second slot,
the primary alignment sleeve extends away from the primary member body,
the secondary alignment sleeve extends away from the secondary member body, and
the adjustment portion is provided at the secondary member body.

2. The pipe connection according to claim 1, wherein:
the locking ring comprises a first contact ring area configured to make first contact with the adjustment portion of the secondary pipe member to adjust the ring diameter at the secondary ring part during said make-up of the pipe connection,
the adjustment portion comprises a first contact portion area configured to make first contact with the locking ring, more specifically the first contact ring area, to adjust the ring diameter at the secondary ring part during said make-up of the pipe connection,
the primary alignment sleeve comprises a first overlap primary sleeve area which overlaps as first the secondary alignment sleeve during said make-up of the pipe connection,
the secondary alignment sleeve comprises a first overlap secondary sleeve area which overlaps as first the primary alignment sleeve, more specifically the first overlap primary sleeve area, during said make-up of the pipe connection, and
a first axial distance between the first contact ring area and the first overlap primary sleeve area of the locking ring being engaged to the primary pipe member is shorter than a second axial distance between the first contact portion area and the first overlap secondary sleeve area.

3. The pipe connection according to claim 1, wherein:
the primary alignment sleeve comprises a primary alignment surface,
the secondary alignment sleeve comprises a secondary alignment surface,
the primary alignment sleeve and the secondary alignment sleeve are configured to overlap with the primary alignment surface and the secondary alignment surface facing each other.

4. The pipe connection according to claim 3, wherein:
the primary circumferential surface of the primary pipe member is a primary external circumferential surface,
the secondary circumferential surface of the primary pipe member is a secondary external circumferential surface,
the ring circumferential surface of the locking ring is a ring internal circumferential surface, and
the adjustment portion is an external adjustment portion configured to increase the ring diameter of the secondary ring part of the locking ring.

5. The pipe connection according to claim 3, wherein:
the primary circumferential surface of the primary pipe member is a primary internal circumferential surface,
the secondary circumferential surface of the primary pipe member is a secondary internal circumferential surface,
the ring circumferential surface of the locking ring is a ring external circumferential surface, and
the adjustment portion is an internal adjustment portion configured to decrease the ring diameter of the secondary ring part of the locking ring.

6. The pipe connection according to claim 1, wherein, at final make-up of the pipe connection, the locking ring engages the primary pipe member and the secondary pipe member, and the primary pipe member, secondary pipe member and the locking ring extend along a longitudinal axis.

7. The pipe connection according to claim 1, wherein the secondary alignment sleeve is located closer to a longitudinal axis than the primary alignment sleeve.

8. The pipe connection according to claim 1, wherein:
the primary alignment sleeve comprises a primary nose,
the secondary alignment sleeve comprises a secondary nose,
the primary pipe member comprises a primary shoulder,
the secondary pipe member comprises a secondary shoulder,
the primary shoulder and the secondary nose are configured to be in contact with each other at final make-up of the pipe connection,
the primary nose comprises a first primary nose surface, a second primary nose surface, and a primary retainer surface,
the second primary nose surface is in radial direction relative to a longitudinal axis of the pipe connection located closer to the longitudinal axis than the first primary nose surface,
the first primary nose surface is in axial direction along the longitudinal axis located closer to said one of the first protrusion and the first slot than the second primary nose surface,
the primary retainer surface is in radial direction relative to the longitudinal axis located between the first primary nose surface and the second primary nose surface,
the secondary shoulder comprises a first secondary shoulder surface, a second secondary shoulder surface, and a secondary retainer surface,
the second secondary shoulder surface is in radial direction relative to the longitudinal axis located closer to the longitudinal axis than the first secondary shoulder surface,
the second secondary shoulder surface is in axial direction along the longitudinal axis located closer to said one of the second protrusion and the second slot than the first secondary shoulder surface,
the secondary retainer surface is in radial direction relative to the longitudinal axis located between the first secondary shoulder surface and the second secondary shoulder surface,
the first primary nose surface and the first secondary shoulder surface are configured to have a first clearance between each other at final make-up of the pipe connection, and
the second primary nose surface and the second secondary shoulder surface are configured to have a second clearance between each other at final make-up of the pipe connection.

9. The pipe connection according to claim 8, wherein:
the primary shoulder comprises a primary shoulder surface extending under an angle $\alpha$ of between, and including, 80 degrees and 90 degrees, preferably between, and including, 85 degrees and 90 degrees, relative to the longitudinal axis,
the secondary nose comprises a secondary nose surface extending under an angle $\beta$ of between, and including, 80 degrees and 90 degrees, preferably between, and including, 85 degrees and 90 degrees, relative to the longitudinal axis, and
the primary shoulder surface and the secondary nose surface are configured to be in contact with each other at final make-up of the pipe connection.

10. The pipe connection according to claim 1, wherein:
the pipe connection comprises an elastomeric seal, and
the elastomeric seal is in radial direction at final make-up located between the primary alignment sleeve and the secondary alignment sleeve.

11. The pipe connection according to claim 10, wherein the elastomeric seal is in axial direction at final make-up located closer to a primary shoulder than to a secondary shoulder.

12. The pipe connection according to claim 1, wherein:
the primary alignment sleeve is in radial direction at final make-up located between the secondary alignment sleeve and the locking ring, and
the primary alignment sleeve is spaced in said radial direction from the locking ring.

13. The pipe connection according to claim 1, wherein:
the secondary alignment sleeve is in radial direction at final make-up located between the primary alignment sleeve and the locking ring, and
the secondary alignment sleeve is spaced in said radial direction from the locking ring.

14. The pipe connection according to any claim 1, wherein:
the first protrusion and the first slot are configured to receive the first protrusion in the first slot at final make-up over a first radial engagement distance relative to a longitudinal axis,
the second protrusion and second slot are configured to receive the second protrusion in the second slot at final make-up over a second radial engagement distance relative to the longitudinal axis, and
the first radial engagement distance is larger than the second radial engagement distance.

* * * * *